US008056714B2

(12) United States Patent
Carnevali

(10) Patent No.: US 8,056,714 B2
(45) Date of Patent: Nov. 15, 2011

(54) PORTABLE DEVICE HOLDER

(76) Inventor: Jeffrey D. Carnevali, Seattle, WA (US)

( * ) Notice: Subject to any disclaimer, the term of this patent is extended or adjusted under 35 U.S.C. 154(b) by 366 days.

(21) Appl. No.: 12/074,944

(22) Filed: Mar. 8, 2008

(65) Prior Publication Data
US 2009/0045234 A1 Feb. 19, 2009

Related U.S. Application Data

(63) Continuation-in-part of application No. 11/893,438, filed on Aug. 16, 2007.

(51) Int. Cl.
B65D 85/00 (2006.01)

(52) U.S. Cl. ............ 206/320; 206/305; 24/3.7; 24/488; 379/446; 379/447; 379/454; 379/449

(58) Field of Classification Search .................. 206/320, 206/305, 316.1, 722, 586, 591, 592; 224/666, 224/667, 668; 379/441–457; 24/3.7, 488; 190/18 A
See application file for complete search history.

(56) References Cited

U.S. PATENT DOCUMENTS

| 1,061,412 | A | * | 5/1913 | Semon | 211/89.01 |
| 2,924,671 | A | * | 2/1960 | Barry | 379/455 |
| 4,845,738 | A | * | 7/1989 | Takano | 455/569.2 |
| 5,060,260 | A | * | 10/1991 | O'Connell | 379/454 |
| 5,480,115 | A | * | 1/1996 | Haltof | 248/221.11 |
| 5,549,331 | A | * | 8/1996 | Yun et al. | 280/843 |
| 5,659,612 | A | * | 8/1997 | Wang | 379/446 |
| 5,697,538 | A | | 12/1997 | Goldenberg et al. | |
| 5,940,502 | A | * | 8/1999 | Hirai et al. | 379/446 |
| 5,964,601 | A | | 10/1999 | Tsurumaru et al. | |
| 6,141,417 | A | * | 10/2000 | Lopez et al. | 379/446 |
| 6,176,401 | B1 | * | 1/2001 | Lim | 224/196 |
| 6,370,037 | B1 | | 4/2002 | Schoenfish | |
| 6,435,690 | B1 | | 8/2002 | Till | |
| 6,529,381 | B1 | | 3/2003 | Schoenfish | |
| 6,561,702 | B1 | | 5/2003 | Yik | |
| 6,955,280 | B2 | | 10/2005 | Saitoh et al. | |
| 7,099,468 | B1 | * | 8/2006 | Shuniak et al. | 379/455 |
| 2002/0009195 | A1 | * | 1/2002 | Schon | 379/454 |
| 2002/0100782 | A1 | | 8/2002 | Marvin | |

OTHER PUBLICATIONS 10 pages of Office action in related U.S. Appl. No. 11/893,438.
14 pages of Response as filed to Office action in related U.S. Appl. No. 11/893,438.

* cited by examiner

Primary Examiner — Mickey Yu
Assistant Examiner — Chun Cheung
(74) Attorney, Agent, or Firm — Charles J. Rupnick, Attorney at Law

(57) ABSTRACT

A quick release device holder for portable electronics devices that protects soft and impressionable housing materials from damage during insertion and removal. The quick release device holder includes a backing plane formed with a substantially rigid spine portion and a receiver pocket adjacent to a first end thereof. One or more latching arms extend from the backing plane spaced away from the receiver pocket, each of the one or more latching arms further including a resiliently flexible stem portion coupled to the backing plane and having a head portion spaced away from the backing plane. The head portion further includes one or more rollers coupled thereto in a position spaced away from an interior surface of the backing plane, and a retention tongue between the one or more rollers and the interior surface of the backing plane and being set back from a circumference of the one or more rollers.

18 Claims, 23 Drawing Sheets

PORTABLE DEVICE HOLDER

This application is a Continuation-in-part and claims priority benefit of copending parent U.S. patent application Ser. No. 11/893,438 filed in the name of Jeffrey D. Carnevali on Aug. 16, 2007, the complete disclosures of which are both incorporated herein by reference.

FIELD OF THE INVENTION

The present invention relates generally portable device holders, and in particular to quick release holders for portable cellular telephones and other portable electronics devices having external housings formed at least partially of an impressionable elastomer.

BACKGROUND OF THE INVENTION

Holders for portable device and in particular quick release holders for portable cellular telephones and other portable electronics devices are generally well-known. However, many modern portable electronics devices include external housings formed at least partially of a soft and impressionable elastomer materials for absorbing shocks and vibrations experienced in rugged outdoor sports and industrial environments and even in everyday use.

Many known portable device holders are incapable of receiving and subsequently releasing portable electronics devices without scaring or other damage to the soft and impressionable materials used in forming all or at least part of their external cases.

SUMMARY OF THE INVENTION

The present invention is a novel quick release device holder for portable electronics devices that overcomes limitations of prior device holders for protecting soft and impressionable elastomer housing materials from damage during insertion and removal.

According to one aspect of the novel quick release device holder includes a backing plane formed with a substantially rigid spine portion and including a receiver pocket adjacent to a first end thereof; a substantially spherical ball roller; one or more latching arms extending from the backing plane and spaced away from the receiver pocket, each of the one or more latching arms further includes a stem portion coupled to the backing plane and having a head portion spaced away from the backing plane; and a cage coupled to the head portion of one or more of the latching arms in a position spaced away from an interior surface of the backing plane and rotatably retaining the ball roller operably about a rotational axis oriented substantially transverse to a direction substantially normal to the interior surface of the backing plane.

According to another aspect of the novel quick release device holder, the stem portion of each of the pair of the latching arms further includes a resiliently flexible stem portion.

According to another aspect of the novel quick release device holder, each of the one or more latching arms further includes a retention tongue between the ball roller and the interior surface of the backing plane and being set back from a circumference of the ball roller.

According to another aspect of the novel quick release device holder, the cage retaining the ball roller further includes a part-spherical ball socket matching the ball roller.

According to another aspect of the novel quick release device holder, the cage retaining the ball roller further includes a part-spherical ball socket matching the ball roller, and each of the one or more latching arms further includes a retention tongue between the ball roller and the interior surface of the backing plane and being set back from a circumference of the ball roller.

According to another aspect of the novel quick release device holder, the cage retaining the ball roller further includes a part-spherical ball socket matching the ball roller, and the cage retaining the ball roller further includes a fork having a pair of spaced-apart support flanges extended from the head portion and a pair of cutouts formed on opposing interior surfaces of the flanges.

According to another aspect of the novel quick release device holder, a method is disclosed for using the novel quick release device holder for holding a portable device, the method including at least partially inserting a base portion of a portable device into a receiver pocket formed adjacent to a base portion of a backing plane; moving an upper portion of the device opposite from the base portion thereof toward a spine portion of the backing plane adjacent to the receiver pocket; with at least one rotatable roller rotatably suspended from a resiliently flexible latching arm extended from the spine portion of the backing plane and rotatably suspending the roller in a position spaced away from and opposite of the spine portion and the resiliently flexible latching arm being in a substantially unflexed relaxed state, rollingly engaging the upper portion of the device; while rollingly engaging the upper portion of the device with the roller, resiliently flexing the latching arm into a resiliently flexed state wherein the latching arm is flexed outwardly of the spine portion of the backing plane; while rollingly engaging the upper portion of the device with the roller, seating the device substantially against the spine portion of the backing plane; substantially simultaneously with seating the device substantially against the spine portion of the backing plane, substantially releasing the latching arm from the resiliently flexed state; and substantially simultaneously with substantially releasing the latching arm from the resiliently flexed state, forming at least one retention notch around a portion of the device.

According to another aspect of the method for using the novel quick release device holder, the forming at least one retention notch around a portion of the device further includes forming the retention notch between the spine portion of the backing plane and a retention tongue formed on the latching arm between the roller and the spine portion of the backing plane; and wherein the seating the device substantially against the spine portion of the backing plane further includes rolling the device on a circumferential portion of the roller and past the retention tongue.

According to another aspect of the method for using the novel quick release device holder, having at least one rotatable roller rotatably suspended from a resiliently flexible latching arm further includes having at least one substantially spherical ball roller rotatably suspended in a part-spherical ball socket that substantially matches the ball roller and rotatably suspends the roller therein.

According to another aspect of the method for using the novel quick release device holder, having at least one rotatable roller rotatably suspended from a resiliently flexible latching arm further includes having at least one of a substantially spherical ball roller, and a substantially disk-shaped roller rotatably suspended in a cage at least having a fork formed on a terminal head portion of the latching arm facing substantially toward the backing plane and spaced away from the spine portion thereof, the fork at least having a pair of spaced-apart support flanges extended from the head portion and a pair of cutouts formed on opposing interior surfaces of the flanges and rotatably suspending the roller therefrom.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 32 and 33 illustrate the novel quick release portable device holder, wherein a variation of the belt-and-roller conveyer mechanism is a multi-roller conveyer mechanism formed of a plurality of very small and closely spaced rollers, wherein FIG. 32 illustrates the relatively square contour 12h engaging a distal roller of the multi-roller conveyer mechanism or an intermediate one of the rollers (shown), and FIG. 33 illustrates the multi-roller conveyer mechanism during insertion of the device into the novel quick release portable device holder.

DETAILED DESCRIPTION OF PREFERRED EMBODIMENT

In the Figures, like numerals indicate like elements.

Figure 1:
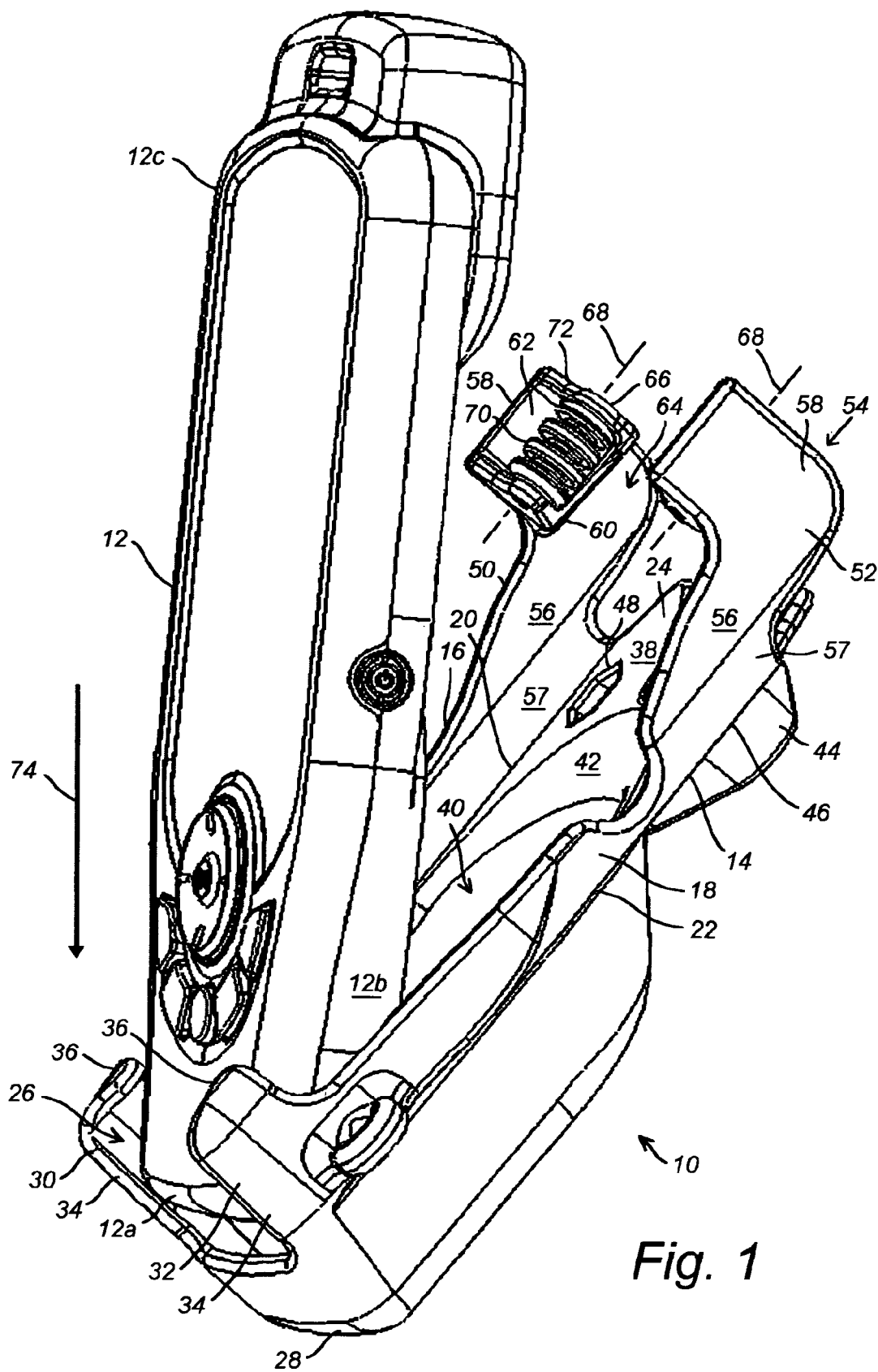
FIG. 1 is a perspective view that illustrates by example and without limitation a novel quick release portable device holder and partial operation thereof in combination with an appropriate device.

FIG. 1 illustrates by example and without limitation a novel quick release portable device holder, indicated generally at 10, in combination with a portable cellular telephone or another portable electronic device 12 illustrated here by example and without limitation as a ONIX400CR GPS (global positioning system) receiver available from Bushnell Corporation® of Overland Park, Kans. As such, the quick release portable device holder 10 is illustrated as being structured for receiving the device 12. Here, by example and without limitation, the device holder 10 is formed of a substantially rigid material, such as an injection moldable plastic having a backing plane 14 with opposing substantially rigid side walls 16, 18 formed adjacent to opposite sides 20, 22 of a substantially rigid spine portion 24 thereof and spaced appropriately to receive the device 12 snuggly therebetween.

The device holder 10 includes a receiver pocket 26 formed adjacent to a base portion 28 of the backing plane 14 and substantially aligned with the spine portion 24 thereof. Optionally, the receiver pocket 26 is structured to expose a base portion 12a of the device 12, for example when the base portion 12a includes electrical input/output connectors, such as a power connector for recharging the battery and/or a data entry and retrieval port. Accordingly, by example and without limitation, the receiver pocket 26 includes a pair of substantially rigid spaced apart symmetrically opposing receiver arms 30, 32 one each extending from the opposing side walls 16, 18 of the backing plane 14. Each of the opposing arms 30, 32 of the receiver pocket 26 is formed by a stem 34 generally extending away from the backing plane 14 and substantially terminating in a short flange 36 extending inwardly of the backing plane 14 and spaced away from a substantially smooth and generally planar interior device interface or "resting" surface 38 thereof sufficiently to receive the base portion 12a of the device 12. Here, by example and without limitation, the receiver pocket 26 also includes an optional open cavity 40 depressed into the backing plane 14 to accommodate a backwardly protruding portion 12b adjacent to the base portion 12a of the device 12.

The interior spine portion 24 of the backing plane 14 together with the opposing side walls 16, 18 and the receiver pocket 26 partially encloses an interior volume 42 of the device holder 10. A mounting interface structure 44 formed on an outside backing surface 46 of the backing plane 14 is structured for mounting either directly or indirectly on an external surface. By example and without limitation, the mounting interface structure 44 includes a pair holes 48 structured to receive a fastener therethrough.

The novel quick release device holder 10 is further formed with a pair of symmetrically opposing resiliently expandable latching or "spring" arms 50, 52 spaced apart on opposite sides 20, 22 of the backing plane 14. The spring arms 50, 52 extend along the respective opposing side walls 16, 18 of the backing plane 14 in positions adjacent to a second entrance end 54 of the device holder 10 spaced apart from the receiver pocket 26, the entrance end 54 of the device holder 10 being illustrated here by example and without limitation as being generally open for receiving the device 12 thereinto.

Each of the spaced apart spring arms 50, 52 is formed by example and without limitation as having a resiliently flexible stem portion 56 projected from the spine 24 of the backing plane 14 in a curved root portion 57 and extending along the respective side wall 16, 18 away from the receiver pocket 26. Each of the spring arms 50, 52 is illustrated as terminating in head portion 58 spaced away from the spine 24 of the backing plane 14. Each head portion 58 is formed with a device retention tongue 60 extended from an interior surface 62 thereof. Each retention tongue 60 extends inwardly of the backing plane 14 and generally toward the opposing one of the arms 50 (or 52). Each retention tongue 60 generally faces toward the device resting surface 38 interior of the backing plane 14 and is spaced away therefrom. A device retention notch 64 is formed between the retention tongue 60 of each spring arm 50, 52 and the interior device resting surface 38 of the backing plane 14 between the opposing side walls 16, 18 thereof. Thus, one of the retention notches 64 is formed on opposite sides of the device holder 10 adjacent to each of the opposing side walls 16, 18 between the retention tongue 60 of each spring arm 50, 52 and the interior device resting surface 38 of the backing plane 14, which is more clearly shown in subsequent Figures.

Additionally, each of the spring arms 50, 52 also includes a small roller 66 rotatably coupled to the head portion 58 of each of the spring arm stems 56 with each of the rollers 66 being oriented such that it is rotatable about an axis 68 substantially aligned with a corresponding one of the stems 56. The rollers 66 are each spaced farther from the backing plane 14 than the corresponding retention tongue 60. Furthermore, each of the rollers 66 has a circumference 70 that is sufficiently large relative to the head portion 58 as to be extended inwardly of the backing plane 14 into the interior volume 42 of the device holder 10 toward the opposing one of the arms 50 (or 52) farther than the corresponding retention tongue 60. Accordingly, as more clearly illustrated in subsequent Figures, the retention tongue 60 includes a set-back 71 from the circumference 70 of the rollers 66 large enough for the retention tongue 60 to remain spaced away from contact with the device 12 during both insertion and subsequent removal.

Optionally, as illustrated here, the rollers 66 are suspended from the corresponding head portion 58 on a pair of support flanges 72 extended from the interior surface 62 thereof. Each pair of support flanges 72 is structured to rotatably couple the corresponding roller 66 therebetween. The circumference 70 of each roller 66 is sufficiently large relative to the support flanges 72 as to be extended inwardly of the backing plane 14 into the interior volume 42 of the device holder 10 toward the opposing one of the arms 50 (or 52) farther than the corresponding support flanges 72, as more clearly illustrated in subsequent Figures.

As illustrated, the head 58 is optionally formed with the retention tongue 60 integral with the flanges 72 supporting the rollers 66.

As illustrated here, the device 12 is being either inserted into or removed from the novel quick release portable device holder 10. Accordingly, as generally indicated by arrow 74, the base portion 12a of the device 12 is received into the receiver pocket 26 between the inwardly extending flanges 36 adjacent to the ends of the stems 34 of the receiver arms 30, 32 and the interior device resting surface 38 of the backing plane 14, while the backwardly protruding portion 12b of the device 12 is received into the cavity 40. At this stage, a head portion 12c of the device 12 is outside the device holder 10.

Figure 2:
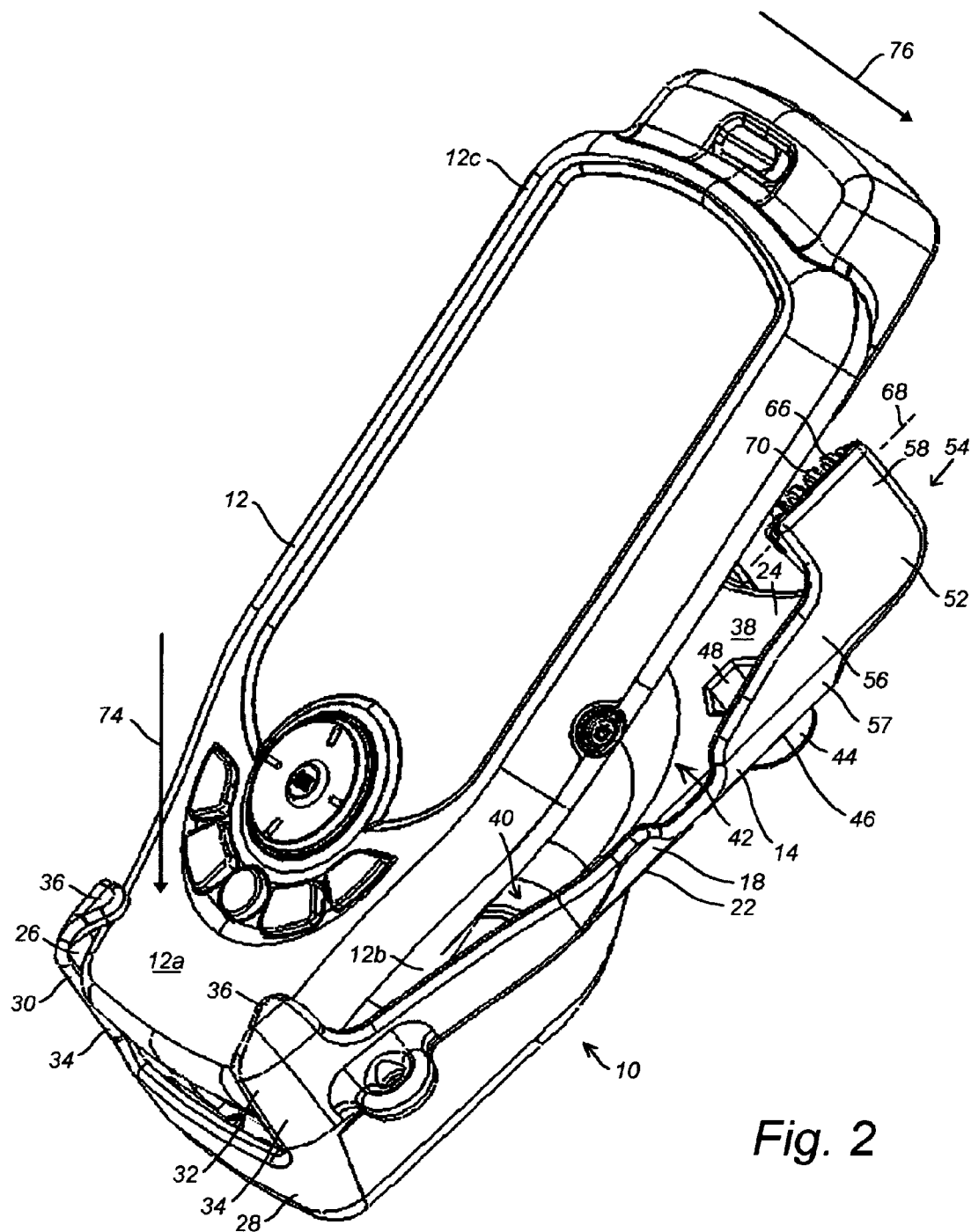
FIG. 2 is another perspective view that illustrates by example and without limitation a novel quick release portable device holder and partial operation thereof in combination with an appropriate device.

FIG. 2 illustrates the device 12 is being either inserted farther into or less removed from the novel quick release portable device holder 10. Accordingly, as generally indicated by arrow 76, the head portion 12c of the device 12 is rotated in a direction substantially normal to the interior device resting surface 38 of the backing plane 14 about the base portion 12a relative to the receiver pocket 26. Initially, the device 12 is rotated until opposing shoulder portions 12d of the device 12 on opposite sides of the head portion 12c contact the rollers 66 on the respective head portions 58 of the spring arm stems 56. At this stage, the head portion 12c of the device 12 is outside the device holder 10.

Figure 3:
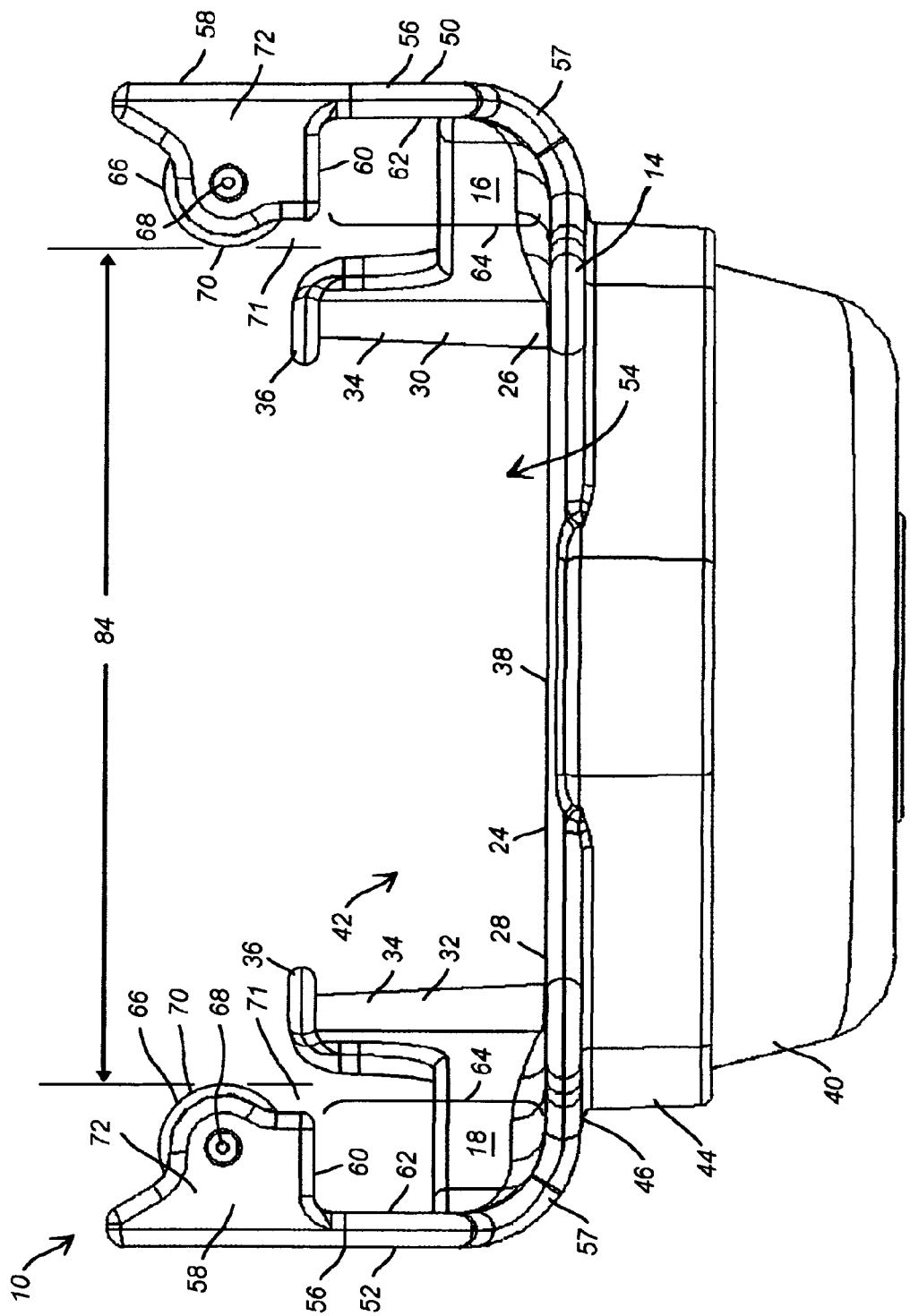
FIG. 3 illustrates the novel quick release portable device holder as seen from one end.

FIG. 3 illustrates the novel quick release portable device holder 10 as seen from the entrance end 54 opposite from the receiver pocket 26. The device holder 10 is shown here without the device 12. As illustrated here, the stems 56 of the spring arms 50, 52 extend out of both the respective side wall 16, 18 and the opposite sides 20, 22 of spine 24 of the backing plane 14. As illustrated here and discussed herein, each of the spring arms 50, 52 terminates in head portion 58, which includes support flanges 72 extended from the interior surface 62 thereof and spaced away from the spine 24 of the backing plane 14. As illustrated here, the retention tongues 60 are formed integrally with the flanges 72 on interior surfaces thereof substantially facing toward the device resting surface 38 interior of the backing plane 14 and spaced away therefrom. The retention notches 64 are formed between the inwardly facing retention tongues 60 and the device resting surface 38 interior of the backing plane 14. One of the retention notches 64 is thus formed on each side of the device holder 10 adjacent to each of the opposing side walls 16, 18 between the retention tongue 60 of each spring arm 50, 52 and the interior device resting surface 38 of the backing plane 14.

Figure 4:
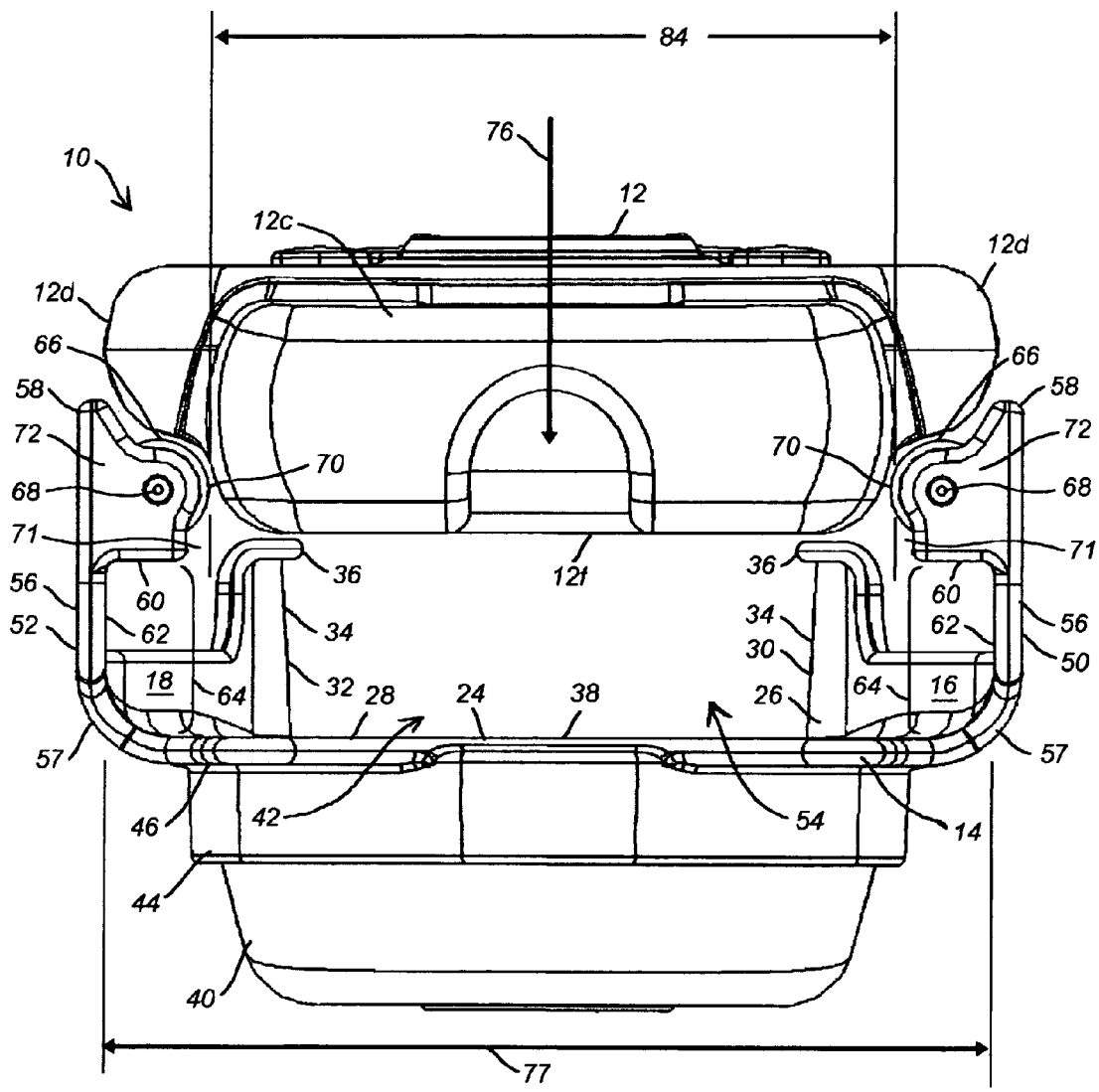
FIG. 4 illustrates the device immediately outside the novel device holder.

FIG. 4 illustrates the head portion 12c of the device 12 immediately outside the device holder 10. As illustrated, the device holder 10 is sized with the interior surfaces 62 of the opposing head portions 58 being spaced apart by a distance 77 slightly wider than the opposing shoulder portions 12d to receive the device 12 snuggly therebetween. The retention tongues 60 are set sufficiently far from the device resting surface 38 interior of the backing plane 14 to permit the shoulder portions 12d of the device 12 to be received into the retention notches 64. The rollers 66 are positioned on the respective head portions 58 to engage the device's shoulder portions 12d before engagement thereof by the supporting flanges 72. As discussed herein, the axes 68 of the rollers 66 are substantially aligned with a corresponding one of the stems 56. Furthermore, the axes 68 of the rollers 66 are further oriented substantially crosswise of the rotational direction of the head portion 12c of the device 12 during insertion and removal, that is substantially normal to the interior device resting surface 38 of the backing plane 14, as generally indicated by arrow 76.

Figure 5:
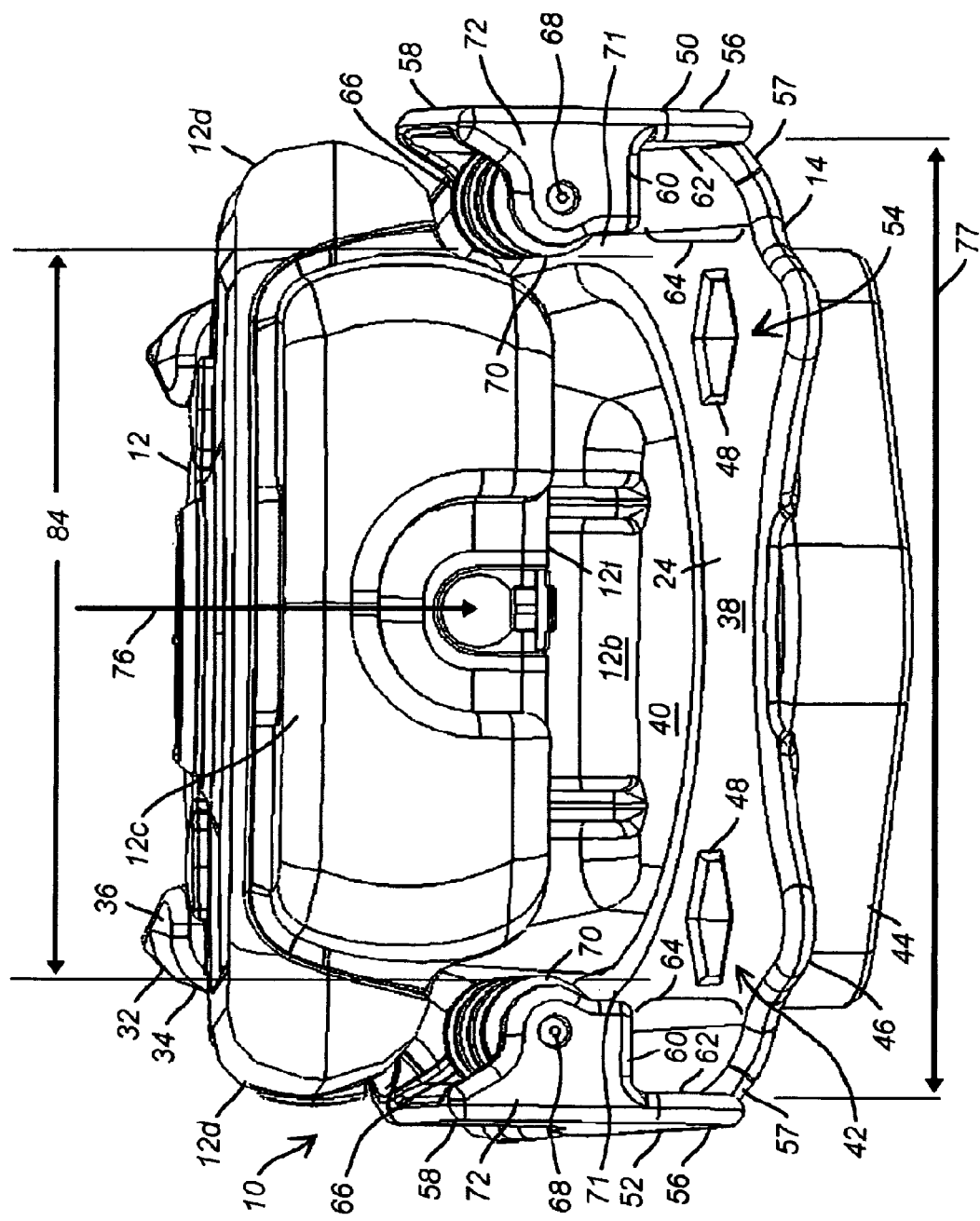
FIG. 5 is a perspective view illustrating the entire device immediately outside the novel device holder.

FIG. 5 is a perspective view illustrating the entire device 12 immediately outside the device holder 10, similarly to FIG. 4.

Figure 6:
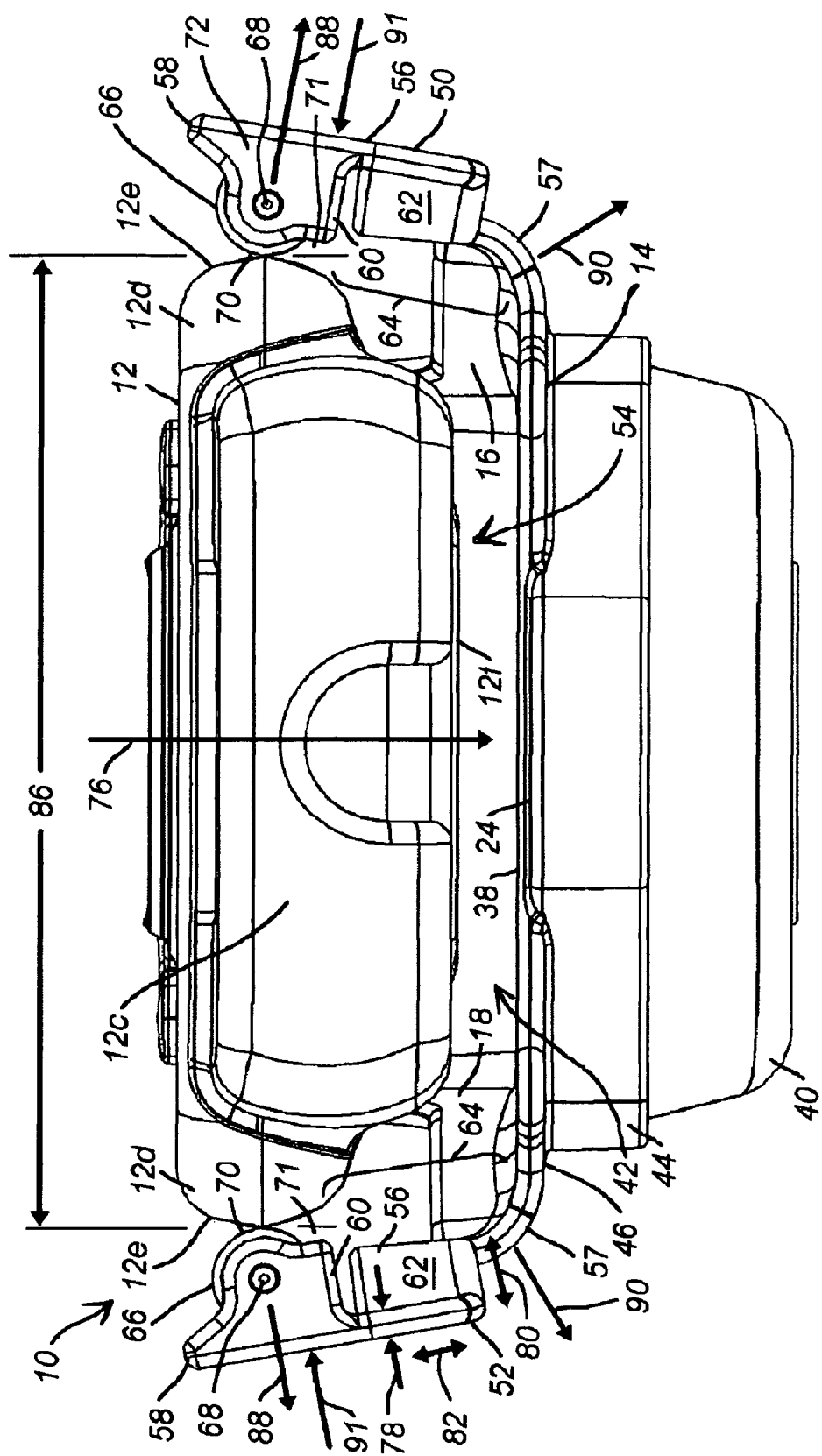
FIG. 6 illustrates an intermediate step in the process of inserting the device into the novel device holder, or subsequently removal therefrom.

FIG. 6 illustrates an intermediate step in the process of inserting the device 12 into the device holder 10, or subsequently removing it therefrom. The device holder 10 is formed of a substantially rigid material, such as an injection moldable plastic. However, in thin sections the substantially rigid material is resiliently flexible. Accordingly, a thickness 78 is selected for the pair of symmetrically opposing resiliently flexible latching or "spring" arms 50, 52 relative to other parameters, including for example a length dimension 80 and a width dimension 82 of the stem portions 56, as well as dimensions of the curved root portion 57 coupling the stem portions 56 to the spine 24 of the backing plane 14. Appropriate selection of these parameters determined using known mechanical design principles and tools in combination with material selection results in each spring arm 50, 52 being stiff but sufficiently resiliently flexible as to form torsion springs having the head portion 58 at its terminus. The spring arms 50, 52 are resiliently spreadable to increase an initial relaxed inter-roller spacing 84 between the rollers 66 (shown in FIG. 3) to an intermediate expanded inter-roller spacing 86 spread sufficiently wide to pass therebetween the opposing shoulder portions 12d of the device 12.

Here, the stem portion 56 of the spring arms 50, 52 is formed by example and without limitation having a thickness dimension 78 of about 1/10 inch, a effective length dimension 80 of about 2 inches, and a width dimension 82 varying between about 1/4 inch nearer the receiver pocket 26 and about 5/8 inch nearer the head portion 58, when the device holder 10 is formed of a substantially rigid injection moldable plastic material.

As generally indicated by arrows 88, the stem portions 56 of the spring arms 50, 52 simultaneously flex outward of the spine 24 of the backing plane 14 to expanded inter-roller spacing 86 sufficiently wide for the shoulder portions 12d of the device 12 to pass between the opposing rollers 66, as generally indicated by arrow 76. Optionally, as generally indicated by arrows 90, the curved root portions 57 of the spring arms 50, 52 are also structured to flex outward of the spine 24 of the backing plane 14 simultaneously with the flexing stem portions 56, whereby the curved root portions 57 are also involved in expanding the relaxed inter-roller spacing 84 to the expanded inter-roller spacing 86 necessary for passing the shoulder portions 12d of the device 12 between the opposing rollers 66. Accordingly, involvement of the root portions 57 in spreading the spring arms 50, 52 is also contemplated and may be included as a matter of design choice without deviating from the scope and intent of the present invention.

As illustrated, during the insertion (and removal) process, only the rollers 66 contact the device shoulders 12d. As indicated by arrows 91, spring pressure of the expanded spring arms 50, 52 causes the rollers 66 to substantially continuously follow contours 12e of device shoulders 12d. The circumference 70 of the rollers 66 is sufficiently large relative to other components the head portion 58 generally and the device retention tongues 60 particularly such that contact with the device shoulders 12d is effectively restricted to only the rollers 66 during both the insertion and removal processes. The rollers 66 remain in contact with the device shoulders 12d until a back portion 12f of the device 12 is substantially seated against the device resting surface 38 interior of the backing plane 14 with the base portion 12a of the device 12 is seated in the receiver pocket 26, and if present the backwardly protruding portion 12b of the device 12 is received into the cavity 40. Thus, the rollers 66 protect the soft and impressionable elastomer materials of the device shoulders 12d from any contact with the unforgiving rigid material of the head portion 58 generally and the device retention tongues 60 particularly so that scratching and other potential damage to the device 12 is avoided. Rolling motion of the rollers 66 over the device shoulders 12d even ensures that even the surface finish of the soft and impressionable elastomer materials of the device 12 is protected even from scuffing. Accordingly, the rollers 66 are optionally either a soft rubbery material, such as neoprene, or a harder material, such as injection molded plastic. Either the soft rubbery material or the harder material can be used without damaging even the surface finish of the soft and impressionable elastomer materials of the device 12.

Incorporation of the roller 66 with the head portion 58 also results in the spring arms 50, 52 operating to retract the device 12 into the holder 10. During progress toward the retention notches 64, the shoulder portions 12d of the device 12 pass an equilibrium position relative to the rollers 66 when a maximum of the contours 12e of the shoulder portions 12d is aligned with the axes 68 of the rollers 66, as illustrated. At this point during insertion of the device 12, the spring pressure of the expanded spring arms 50, 52, as indicated by arrows 91, causes the arms 50, 52 to contract toward one another across the device 12. The contours 12e of device shoulders 12d becoming narrower permits the maximally expanded spring arms 50, 52 to press the device shoulders 12d toward the device resting surface 38 interior of the backing plane 14 by pressure of the contracting rollers 66, as indicated by arrow 76.

Figure 7:
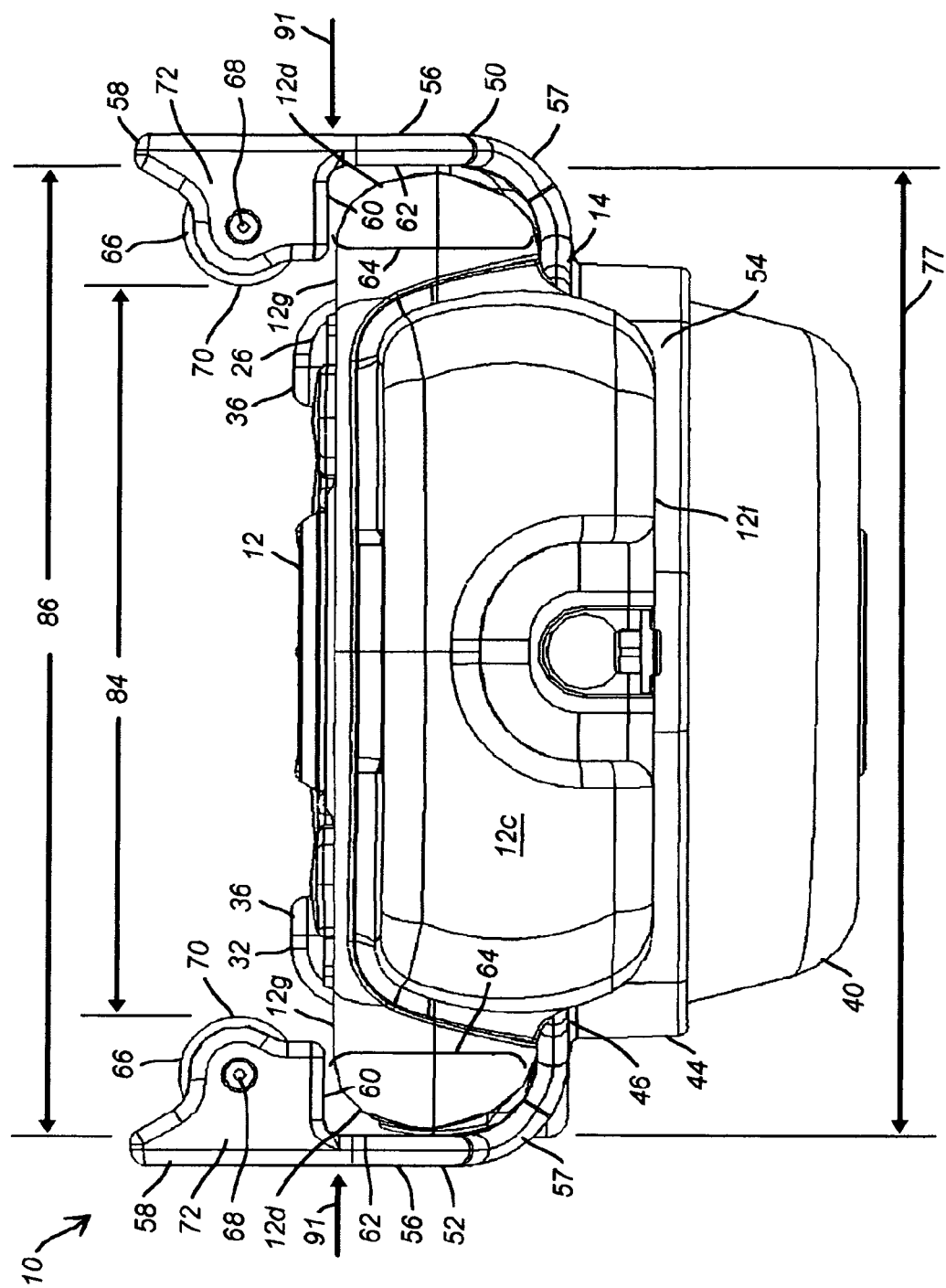
FIG. 7 illustrates a pair of spring arms of the novel device holder contracted from an expanded spacing for retaining the device therein.

FIG. 7 illustrates the spring arms 50, 52 contracted from the shoulder-width expanded inter-roller spacing 86 needed to receive the device 12 to the initial relaxed inter-roller spacing 84. The spring arms 50, 52 contract automatically due to spring pressure, as generally indicated by arrows 91. The spring arms 50, 52 operate by spring torque caused by twisting deflection of the stem portions 56 away the spine 24 and respective opposing side walls 16, 18 of the backing plane 14. Additional spring torque may be caused by the involvement of the root portions 57 in spreading the spring arms 50, 52 as a matter of design choice without deviating from the scope and intent of the present invention. Accordingly, once the device 12 is out from between the rollers 66, the head portions 58 snap back into their respective relaxed positions with their respective interior surfaces 62 adjacent to the device shoulders 12d and the inwardly facing retention tongues 60 adjacent to a face portion 12g of the device head portion 12c. The head portions 58 of the respective spring arms 50, 52 thus reform the retention notches 64 between the inwardly facing retention tongues 60 and the device resting surface 38 interior of the backing plane 14. Thereafter, the device shoulder portions 12d are captured within the retention notches 64, and the device 12 is effectively retained in the interior volume 42 of the device holder 10.

Figure 8:
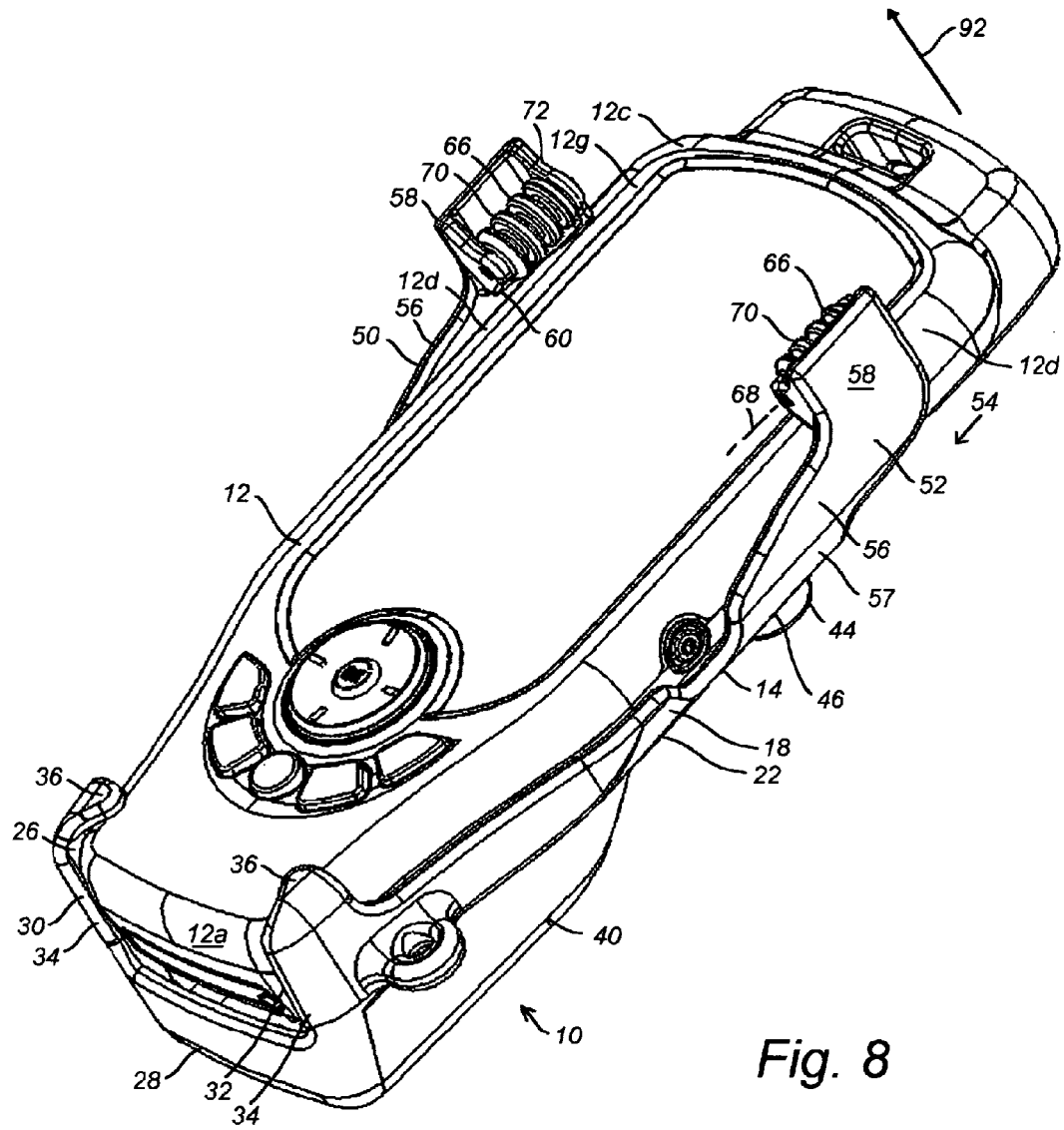
FIG. 8 also illustrates the spring arms of the novel device holder contracted from the expanded spacing for retaining the device therein.

FIG. 8 also illustrates the spring arms 50, 52 contracted from the shoulder-width expanded inter-roller spacing 86 needed to receive the device 12 to the initial relaxed inter-roller spacing 84. Accordingly, the base portion 12a of the device 12 is seated in the receiver pocket 26 with the backwardly protruding portion 12b of the device 12, if present, received into the cavity 40, while the device shoulder portions 12d are captured within the retention notches 64, and the device 12 is effectively retained in the interior volume 42 of the device holder 10.

The device 12 is subsequently removed from the novel quick release portable device holder 10 in reverse of the insertion described herein by simply forcing the head portion 12c away from the backing plane 14 in a direction substantially normal to the interior device resting surface 38, as generally indicated by arrow 92. Pressure of the shoulder portions 12d against the rollers 66 forces the heads 58 to flex outwardly away from the backing plane 14, whereupon the shoulder portions 12d are rolled through the resulting expanded inter-roller spacing 86.

Incorporation of the roller 66 with the head portion 58 also results in the spring arms 50, 52 operating to eject the device 12 from the holder 10. During removal from the retention notches 64, the maximum of the contours 12e of the shoulder portions 12d of the device 12 pass the equilibrium position relative to the rollers 66, as illustrated in FIG. 6. Thereafter, the spring pressure of the expanded spring arms 50, 52, as indicated by arrows 91, causes the arms 50, 52 to contract toward one another across the device 12. The contours 12e of device shoulders 12d becoming narrower permits the maximally expanded spring arms 50, 52 to push the device shoulders 12d away from the device resting surface 38 interior of the backing plane 14 by pressure of the contracting rollers 66, as indicated by arrow 92.

Thus, the quick release feature of the device holder 10 is accomplished by the slight pressure that expands the spring arms 50, 52 to release the device 12.

Figure 9:
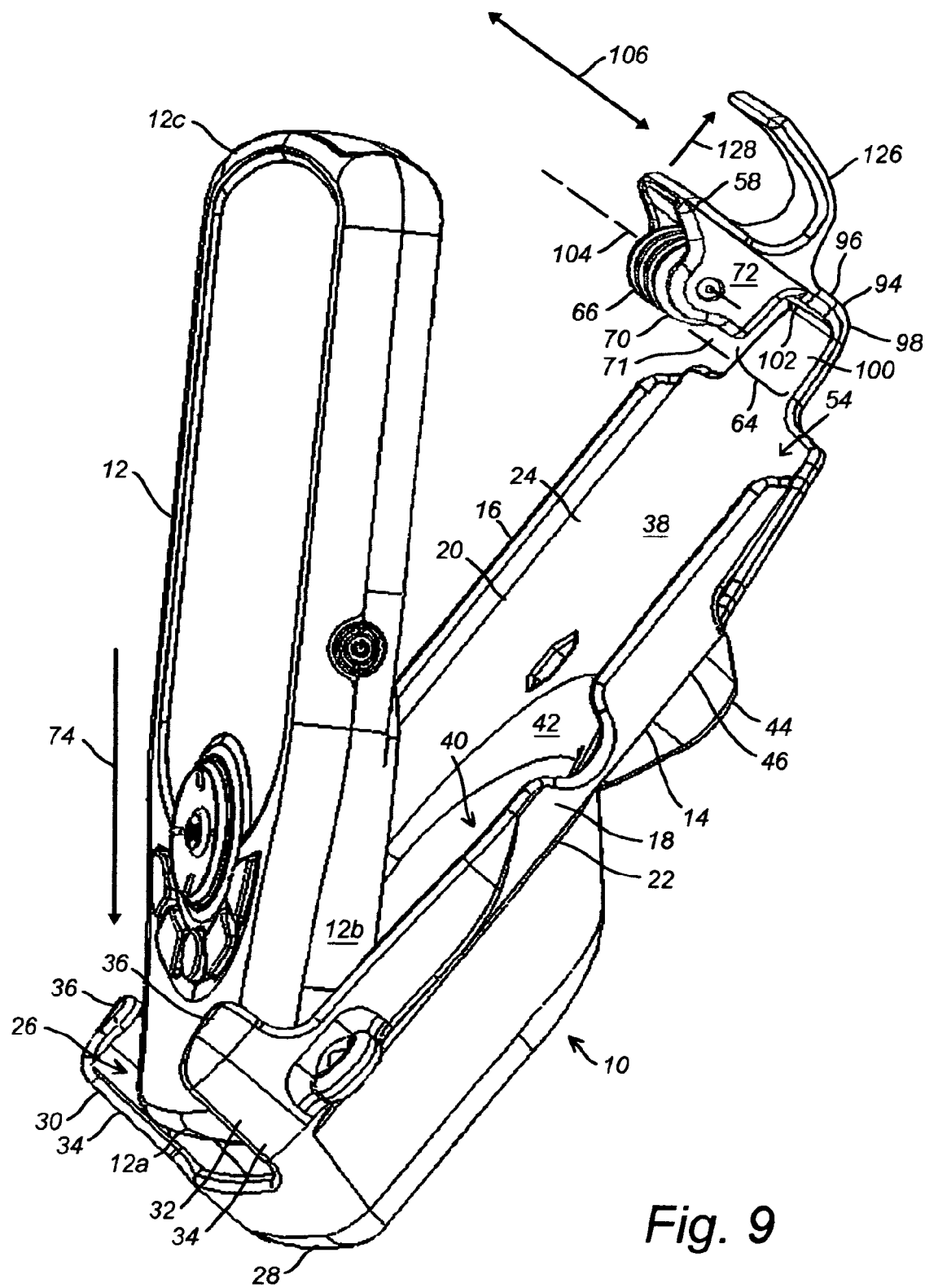
FIG. 9 illustrates one alternative embodiment of the novel quick release portable device holder.

FIG. 9 illustrates one alternative embodiment of the novel quick release portable device holder 10. Such alternative embodiments are also contemplated and may be substituted without deviating from the scope and intent of the present invention. Thus, as illustrated here by example and without limitation, the device holder 10 is formed with as little as a single resiliently expandable latching or "spring" arm 94 adjacent to the entrance end 54 and spaced apart from the receiver pocket 26. However, multiple spring arms 94 are also contemplated and may be substituted as a matter of design choice without deviating from the scope and intent of the present invention.

The one or more spring arms 94 is formed by example and without limitation as having a resiliently flexible stem portion 96 projected from the spine 24 of the backing plane 14 in a curved root portion 98 and extending substantially normal to the spine 24 away from the device resting surface 38 interior of the backing plane 14. Optionally, as illustrated here, the spring arm 94 also includes a resiliently flexible base portion 100 extended, for example, between the spine 24 of the backing plane 14 and the curved root portion 98. The resiliently flexible base portion 100 of the spring arm 94 is optionally formed as a neck-down portion of the backing plane spine 24, as illustrated, or another portion of the backing plane 14. The base portion 100 is extended adjacent to the entrance end 54 of the of the device holder 10 beyond the side walls 16, 18 of the backing plane 14. The base portion 100 thus avoids the stiffening influence of the side walls 16, 18 so that its flexibility is a function of its length, width and thickness dimensions in combination with the selected material and can be determined using known mechanical design principles and tools.

Each of the one or more spring arms 94 is illustrated as terminating in the head portion 58 spaced away from the spine 24 of the backing plane 14. As discussed herein, each head portion 58 is formed with the device retention tongue 60 extended from an interior surface 102 thereof. Each retention tongue 60 extends inwardly of the backing plane 14 and generally toward the opposing receiver pocket 26 thereof adjacent to the base portion 28 of the backing plane 14. Each retention tongue 60 generally faces toward the device resting surface 38 and is spaced away therefrom. The device retention notch 64 is formed between the retention tongue 60 and the device resting surface 38 interior of the backing plane 14 between the opposing side walls 16, 18 thereof. Thus, one of the retention notches 94 is formed adjacent to entrance end 54 of the device holder 10, which is more clearly shown in subsequent Figures.

Additionally, each of the one or more spring arms 94 also includes the small roller 66 rotatably coupled to the head portion 58 with each of the rollers 66 being oriented such that it is rotatable about an axis 104 substantially aligned with the receiver pocket 26 and the device resting surface 38 interior of the backing plane 14. The roller 66 is spaced farther from the backing plane 14 than the corresponding retention tongue 60. Furthermore, the circumference 70 of the roller 66 is sufficiently large relative to the head portion 58 as to be extended inwardly of the backing plane 14 into the interior volume 42 of the device holder 10 toward the opposing receiver pocket 26 farther than the corresponding retention tongue 60.

Optionally, as illustrated here, the roller 66 is suspended from the corresponding head portion 58 on the pair of support flanges 72 extended from the interior surface 102 thereof. The support flanges 72 are structured to rotatably couple the corresponding roller 66 therebetween. The circumference 70 of the roller 66 is sufficiently large relative to the support flanges 72 as to be extended inwardly of the backing plane 14 into the interior volume 42 of the device holder 10 toward the opposing receiver pocket 26 farther than the corresponding support flanges 72. Accordingly, as more clearly illustrated in subsequent Figures, the retention tongue 60 includes the set-back 71 from the circumference 70 of the rollers 66 large enough for the retention tongue 60 to remain spaced away from contact with the device 12 during both insertion and subsequent removal.

As illustrated, the head 58 is optionally formed with the retention tongue 60 integral with the flanges 72 supporting the roller 66.

As illustrated here and generally indicated by arrow 106, the device 12 is being either inserted into or removed from the novel quick release portable device holder 10 along a direction substantially normal to the interior device resting surface 38 of the backing plane 14. Accordingly, as generally indicated by arrow 74, the base portion 12a of the device 12 is received into the receiver pocket 26 between the inwardly extending flanges 36 adjacent to the ends of the stems 34 of the receiver arms 30, 32 and the device resting surface 38 interior of the backing plane 14, while the backwardly protruding portion 12b of the device 12 is received into the cavity 40. At this stage, a head portion 12c of the device 12 is outside the device holder 10.

As discussed herein, the head portion 12c of the device 12 is rotated about the base portion 12a relative to the receiver pocket 26 until opposing shoulder portions 12d of the device 12 on opposite sides of the head portion 12c contact the rollers 66 on the respective head portions 58 of the spring arm stems 56.

Figure 10:
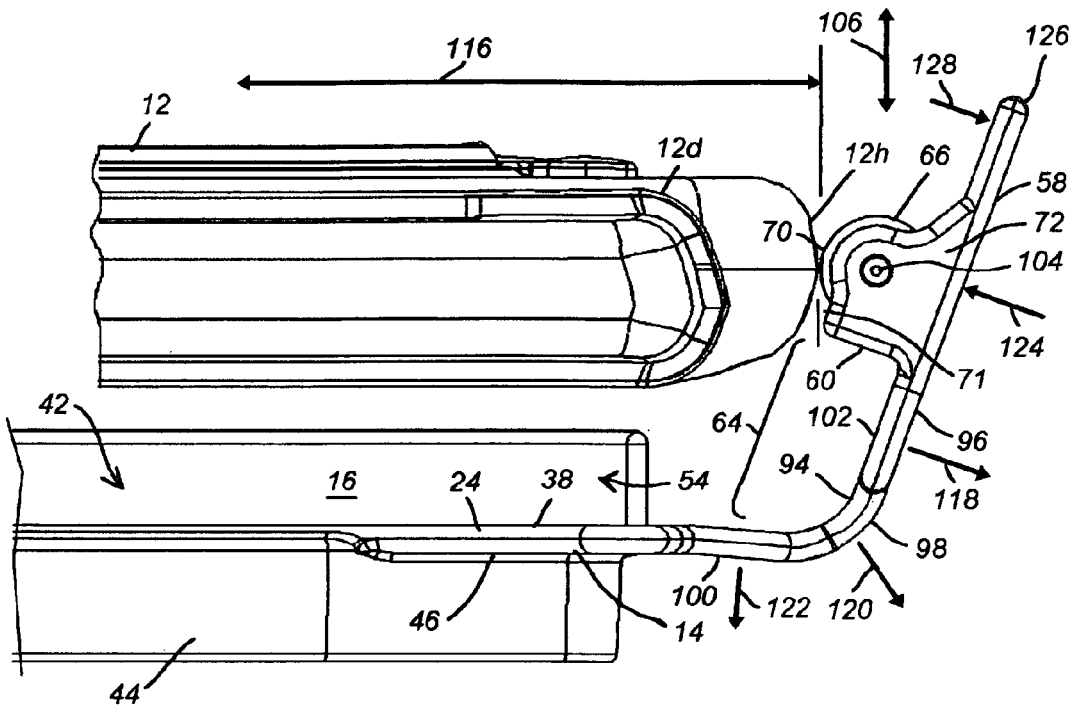
FIG. 10 illustrates an intermediate step in the process of inserting the device into the alternative novel device holder, or subsequently removal therefrom.

FIG. 10 illustrates the intermediate step in the process of inserting the device 12 into the alternative device holder 10, or subsequently removing it therefrom. The alternative device holder 10 is formed of a substantially rigid material, such as an injection moldable plastic, as discussed herein. However, as discussed herein, in thin sections the substantially rigid material is resiliently flexible. Accordingly, a thickness 108 is selected for the resiliently flexible latching or "spring" arm 94 relative to other parameters, including for example a length dimension 110 and a width dimension 112 (normal to page) of the stem portion 96, as well as dimensions of the curved root portion 98 and the resiliently flexible base portion 100, if present. Appropriate selection of these parameters determined using known mechanical design principles and tools in combination with material selection results in spring arm 94 being stiff but sufficiently resiliently flexible as to form torsion springs having the head portion 58 at its terminus. The spring arm 94 is resiliently spreadable to increase an initial relaxed roller-to-receiver pocket spacing 114 between the roller 66 and the opposing receiver pocket 26 (shown in FIG. 11) to an intermediate expanded roller-to-receiver pocket spacing 116 spread sufficiently wide to pass therebetween the head portion 12c of the device 12.

As generally indicated by arrow 118, the stem portion 96 of the spring arm 94 flexes outward of the spine 24 of the backing plane 14 to expanded roller-to-receiver pocket spacing 116 sufficiently wide for the shoulder portions 12d of the device 12 to pass the roller 66, as generally indicated by arrow 106. Optionally, as generally indicated by arrow 120, the curved root portions 98 of the spring arm 94 is also structured to flex outward of the spine 24 of the backing plane 14 simultaneously with the flexing stem portion 96, whereby the curved root portion 98 is also involved in expanding the relaxed roller-to-receiver pocket spacing 114 to the expanded roller-to-receiver pocket spacing 116 necessary for passing the head portion 12c of the device 12 between the receiver pocket 26 and opposing roller 66. Accordingly, involvement of the root portions 98 in spreading the spring arm 94 is also contemplated and may be included as a matter of design choice without deviating from the scope and intent of the present invention.

Additionally, as generally indicated by arrow 122, the necked-down base portion 100 of the spring arm 94 is also structured to flex outward of the spine 24 of the backing plane 14 simultaneously with the flexing stem and curved root portions 96 and 98, whereby the necked-down base portion 100 is also involved in expanding the relaxed roller-to-receiver pocket spacing 114 to the expanded roller-to-receiver pocket spacing 116 between the receiver pocket 26 and opposing roller 66. Accordingly, involvement of the necked-down base portion 100 in spreading the spring arm 94 is also contemplated and may be included as a matter of design choice without deviating from the scope and intent of the present invention.

As illustrated, during the insertion (and removal) process, only the roller 66 contacts the head portion 12c of the device 12. As indicated by arrow 124, spring pressure of the expanded spring arm 94 causes the roller 66 to substantially continuously follow contours 12h of device head portion 12c. The circumference 70 of the roller 66 is sufficiently large relative to other components the head portion 58 generally and the device retention tongues 60 particularly such that contact with the device head portion 12c is effectively restricted to only the rollers 66 during both the insertion and removal processes. The roller 66 remains in contact with the device head portion 12c until the back portion 12f of the device 12 is substantially seated against the device resting surface 38 interior of the backing plane 14 with the base portion 12a of the device 12 is seated in the receiver pocket 26, and if present the backwardly protruding portion 12b of the device 12 is received into the cavity 40. Thus, the roller 66 protects the soft and impressionable elastomer materials of the device head portion 12c from any contact with the unforgiving rigid material of the head portion 58 generally and the device retention tongues 60 particularly so that scratching and other potential damage to the device 12 is avoided.

Figure 11:
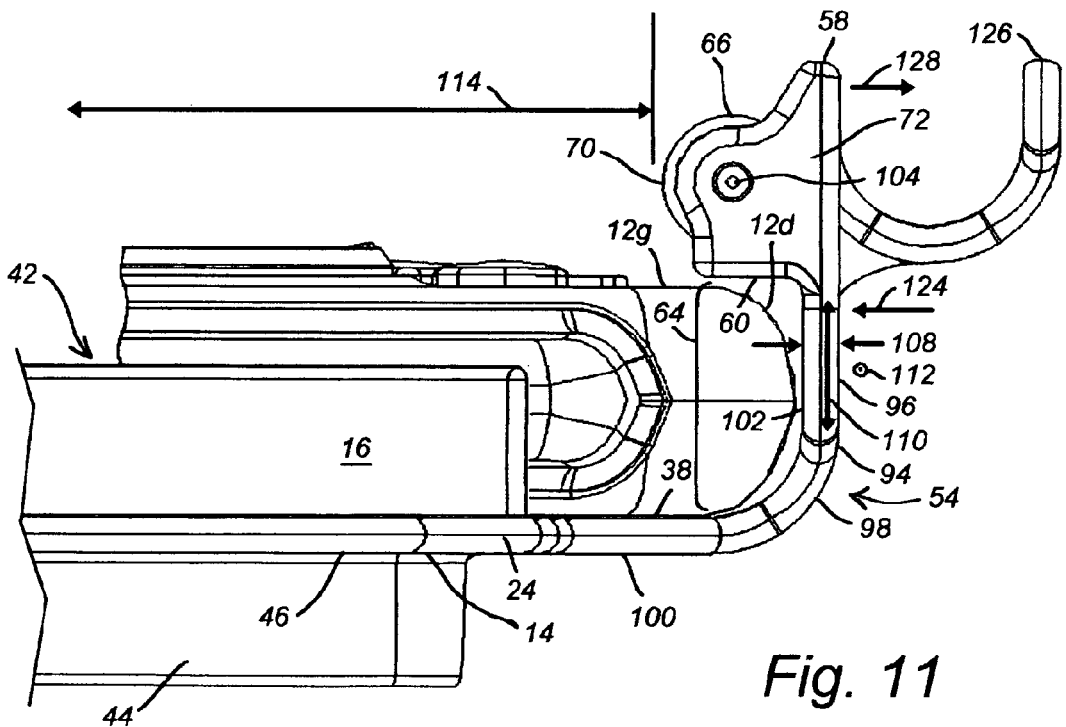
FIG. 11 illustrates a spring arm of the alternative novel device holder contracted from an expanded spacing for retaining the device therein.

FIG. 11 illustrates the spring arm 94 contracted from the shoulder-width expanded roller-to-receiver pocket spacing 116 needed to receive the device 12 to the initial relaxed roller-to-receiver pocket spacing 114. The spring arm 94 contracts automatically due to spring pressure, as indicated by arrow 124. The spring arm 94 operates by spring tension caused by bending deflection of the stem portion 96 away the spine 24 of the backing plane 14. Additional spring tension may be caused by the involvement of the root portion 98 in spreading the spring arm 94 as a matter of design choice without deviating from the scope and intent of the present invention. The necked-down base portion 100 may also be incorporated for adding spring tension into the spreading the spring arm 94 as a matter of design choice also without deviating from the scope and intent of the present invention. Accordingly, once the device 12 is past the roller 66, the head portion 58 snaps back into its relaxed position with its interior surface 62 adjacent to the device head 12c and the inwardly facing retention tongue 60 adjacent to the face portion 12g of the device head portion 12c. The head portion 58 of the spring arm 94 thus reforms the retention notches 64 between the inwardly facing retention tongue 60 and the device resting surface 38 interior of the backing plane 14. Thereafter, the device head portion 12c is captured within the retention notch 64, and the device 12 is effectively retained in the interior volume 42 of the device holder 10.

The device 12 is released from the alternative device holder 10 in reverse of the insertion described herein by forcing the device head portion 12c away from the backing plane 14. Pressure of the head portion 12c against the roller 66 forces the head 58 to flex outwardly away from the backing plane 14, whereupon the head portion 12c is rolled through the resulting expanded roller-to-receiver pocket spacing 116.

Incorporation of the roller 66 with the head portion 58 in the spring arm 94 similarly operates to either retract the device 12 into the holder 10, or to eject it therefrom as a function the position of the axis 104 of the roller 66 relative to the maximum of the contour 12h of the head portion 12c of the device 12.

Optionally, the head 58 is formed with a handle 126 external of the interior volume 42 of the device holder 10. The handle 126 is operable by the user for exerting a force on the spring arm 94 outwardly away from the backing plane 14, as generally indicated by arrow 128. The outward force generally indicated by arrow 109 flexes the stem portion 96 of the spring arm 94 outward of the spine 24 of the backing plane 14, as generally indicated in FIG. 10 by arrow 1118, to expanded roller-to-receiver pocket spacing 116 sufficiently wide for the shoulder portions 12d of the device 12 to pass the roller 66, as generally indicated by arrow 106, whereupon the head portion 12c is rolled through the resulting expanded inter-roller spacing 116.

Optionally, the axes 68 or 104 of the rollers 66 are oriented differently relative to the backing plane 14 as a function of the peculiar shape of the device 12 intended for use with the novel device holder 10.

Figure 12:
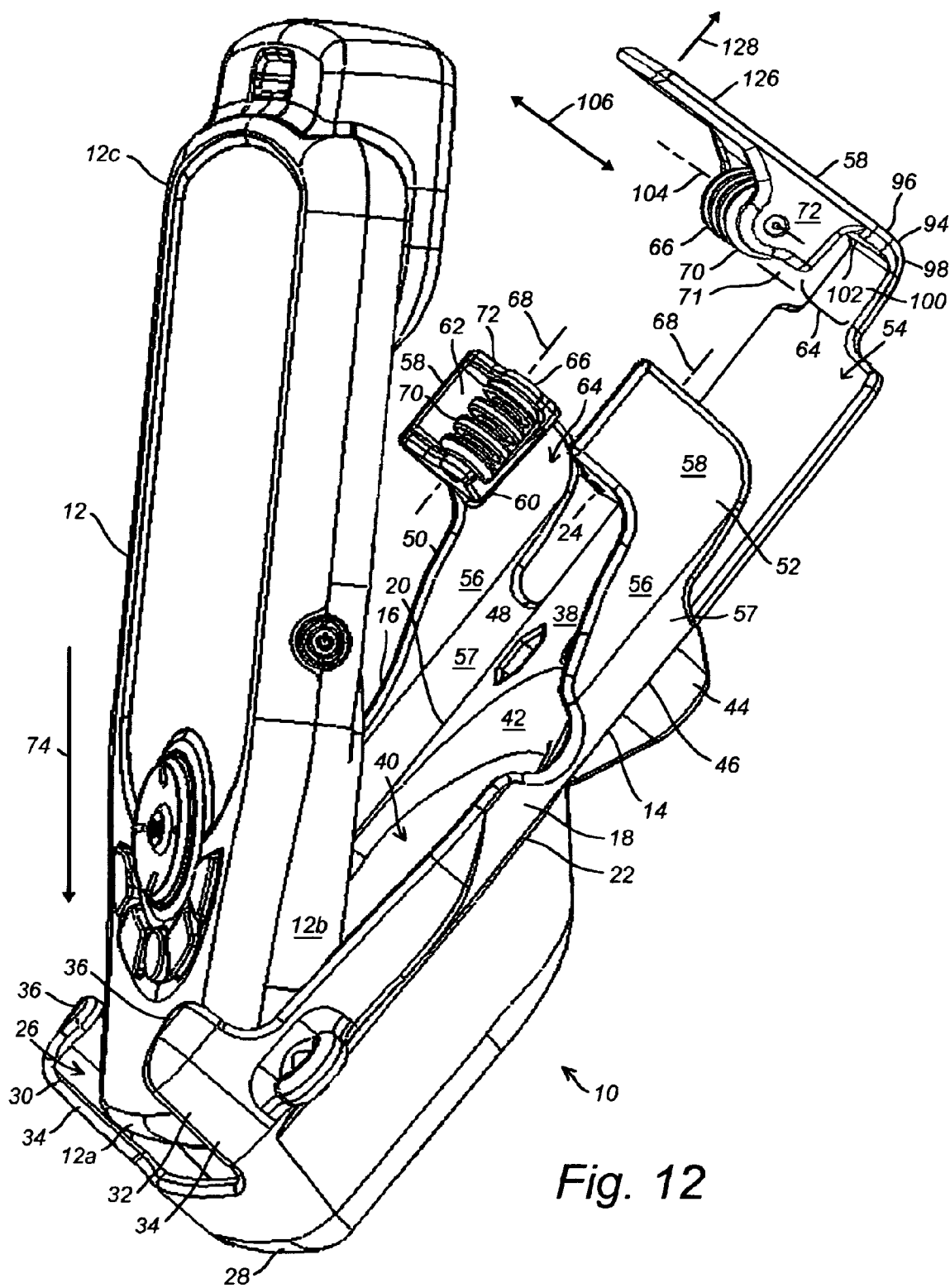
FIG. 12 illustrates another alternative embodiment of the novel quick release portable device holder.

FIG. 12 illustrates another alternative embodiment of the novel quick release portable device holder 10. Such alternative embodiments are also contemplated and may be substituted without deviating from the scope and intent of the present invention. Thus, as illustrated here by example and without limitation, this alternative device holder 10 is formed having the single resiliently expandable latching or "spring" arm 94 adjacent to the entrance end 54 and spaced apart from the receiver pocket 26 in combination with the pair of symmetrically opposing resiliently expandable spring arms 50, 52 spaced apart on opposite sides 20, 22 of the backing plane 14. Multiples of the spring arms 94 and 50, 52 are also contemplated and may be substituted as a matter of design choice without deviating from the scope and intent of the present invention.

Figure 13:
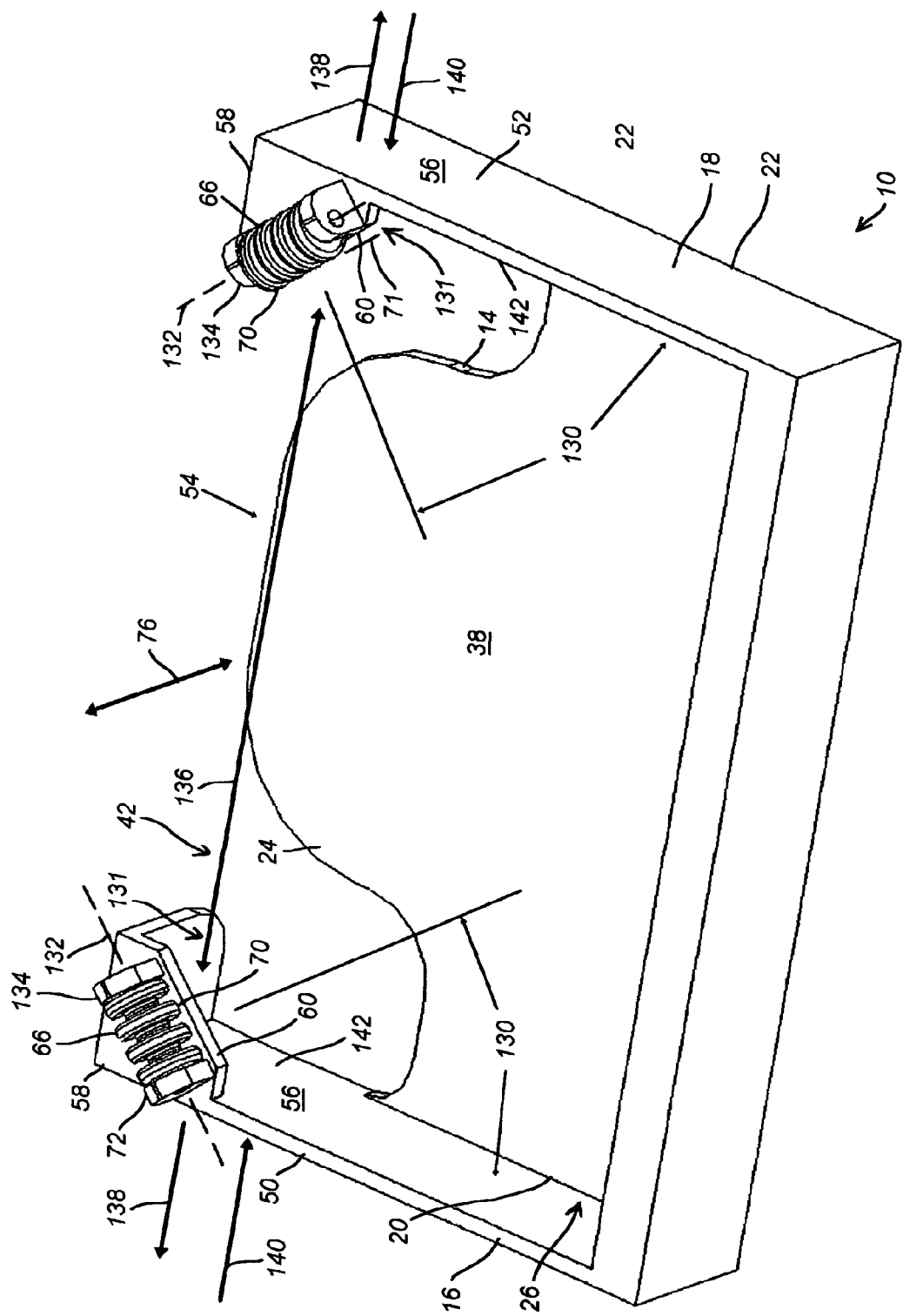
FIG. 13 illustrates still another alternative embodiment of the novel quick release portable device holder.

FIG. 13 illustrates still another alternative embodiment of the novel quick release portable device holder 10. As discussed herein, such alternative embodiments are also contemplated and may be substituted without deviating from the scope and intent of the present invention. Thus, as illustrated here by example and without limitation, this alternative device holder 10 is formed having the pair of symmetrically opposing resiliently expandable spring arms 50, 52 spaced apart on opposite sides 20, 22 of the backing plane 14 adjacent to the entrance end 54 and spaced apart from the receiver pocket 26. As illustrated here in simplified form, each of the spaced apart spring arms 50, 52 is formed by example and without limitation as having the resiliently flexible stem portion 56 projected from the spine 24 of the backing plane 14 and extending along the respective side wall 16, 18 away from the receiver pocket 26. Each of the spring arms 50, 52 is illustrated as terminating in the head portion 58 which is spaced away from the spine 24 of the backing plane 14. Each head portion 58 is formed with the device retention tongue 60 extended from an interior surface 62 thereof. Each retention tongue 60 extends inwardly of the backing plane 14. Here, each retention tongue 60 is oriented at an angle 130 relative to both the spine 24 of the backing plane 14 and the receiver pocket 26. Each retention tongue 60 thus extends generally toward both the receiver pocket 26 and the opposing one of the arms 50 (or 52). Each retention tongue 60 generally faces toward the device resting surface 38 interior of the backing plane 14 and is spaced away therefrom. An angled device retention notch 131 is formed between the retention tongue 60 of each spring arm 50, 52 and the interior device resting surface 38 of the backing plane 14 between the opposing side walls 16, 18 thereof. Thus, one of the angled retention notches 131 is formed on opposite sides of the device holder 10 adjacent to each of the opposing side walls 16, 18 between the retention tongue 60 of each spring arm 50, 52 and the interior device resting surface 38 of the backing plane 14. Furthermore, the angled retention notches 131 are angularly oriented relative to both the spine 24 of the backing plane 14 and the receiver pocket 26 so as to form corner "pockets" on opposite sides of the entrance end 54 of the device holder 10.

Additionally, each of the spring arms 50, 52 also includes the small roller 66 rotatably coupled to the angled head portion 58 with each of the rollers 66 being oriented such that it is rotatable about an axis 132 angled relative to the corresponding stem 56. The rollers 66 are each spaced farther from the backing plane 14 than the corresponding retention tongue 60. Furthermore, each of the rollers 66 is formed with the circumference 70 that is sufficiently large relative to the head portion 58 as to be extended inwardly of the backing plane 14 into the interior volume 42 of the device holder 10 farther than the corresponding retention tongue 60. Accordingly, the retention tongues 60 include the set-back 71 from the circumference 70 of the rollers 66 large enough for the retention tongue 60 to remain spaced away from contact with the device 12 during both insertion and subsequent removal. Furthermore, the axes 132 of the rollers 66 are further oriented substantially crosswise of the rotational direction of the head portion 12c of the device 12 during insertion and removal, that is substantially normal to the interior device resting surface 38 of the backing plane 14, as generally indicated by arrow 76.

Optionally, as illustrated here, the rollers 66 are suspended from the corresponding head portion 58 on a pair of support flanges 134. Each pair of support flanges 134 is structured to rotatably couple the corresponding roller 66 therebetween. The circumference 70 of each roller 66 is sufficiently large relative to the support flanges 134 as to be extended inwardly of the backing plane 14 into the interior volume 42 of the device holder 10 farther than the corresponding support flanges 134.

As illustrated, the head 58 is optionally formed with the retention tongue 60 integral with the flanges 134 supporting the rollers 66.

As discussed herein, the device 12 inserted into the novel quick release portable device holder 10 when the base portion 12a of the device 12 is received into the receiver pocket 26.

The spring arms 50, 52 are resiliently spreadable to increase an initial relaxed inter-roller spacing 136 between the rollers 66 to an intermediate expanded inter-roller spacing spread outwardly of the backing plane 14, as generally indicated by arrows 138, sufficiently wide to pass therebetween the opposing shoulder portions 12d of the device 12. As generally indicated by arrows 138, the stem portions 56 of the spring arms 50, 52 simultaneously flex outward of the spine 24 of the backing plane 14 to expanded inter-roller spacing 136 sufficiently wide for the shoulder portions 12d of the device 12 to pass between the opposing rollers 66, as generally indicated by arrow 76.

During the insertion (and removal) process, only the rollers 66 contact the device shoulders 12d adjacent to corners thereof. As indicated by arrows 140, spring pressure of the expanded spring arms 50, 52 causes the rollers 66 to substantially continuously follow contours 12e of device shoulders 12d. The circumference 70 of the rollers 66 is sufficiently large relative to other components the head portion 58 generally and the device retention tongues 60 particularly such that contact with the device shoulders 12d is effectively restricted to only the rollers 66 during both the insertion and removal processes. The rollers 66 remain in contact with the device shoulders 12d until the back portion 12f of the device 12 is substantially seated against the device resting surface 38 interior of the backing plane 14 with the base portion 12a of the device 12 is seated in the receiver pocket 26. Thus, the rollers 66 protect the soft and impressionable elastomer materials of the device shoulders 12d from any contact with the unforgiving rigid material of the head portion 58 generally and the device retention tongues 60 particularly so that scratching and other potential damage to the device 12 is avoided. Rolling motion of the rollers 66 over the device shoulders 12d even ensures that even the surface finish of the soft and impressionable elastomer materials of the device 12 is protected even from scuffing. Accordingly, the rollers 66 are optionally either a soft rubbery material, such as neoprene, or a harder material, such as injection molded plastic. Either the soft rubbery material or the harder material can be used without damaging even the surface finish of the soft and impressionable elastomer materials of the device 12.

The spring arms 50, 52 contract automatically due to spring pressure, as generally indicated by arrows 140. Accordingly, once the device 12 is out from between the rollers 66, the head portions 58 snap back into their respective relaxed positions with respective interior surfaces 142 adjacent to the device shoulders 12d and the inwardly facing retention tongues 60 adjacent to a face portion 12g of the device head portion 12c. The head portions 58 of the respective spring arms 50, 52 thus reform the angled retention notches 131 between the inwardly facing retention tongues 60 and the device resting surface 38 interior of the backing plane 14. Thereafter, the device shoulder portions 12d are captured within the angled retention notches 131, and the device 12 is effectively retained in the interior volume 42 of the device holder 10.

Thus, alternative configurations of the spring arms 94 and 50, 52 are also contemplated and may be substituted as a matter of design choice without deviating from the scope and intent of the present invention.

In FIGS. 1-13, the small rollers 66 rotatably coupled to the head portion 58 of one or more of the spring arm stems 56 is represented as a substantially round disk or wheel. However, variations are contemplated and may be substituted as a matter of design choice without deviating from the scope and intent of the present invention.

Figure 14:
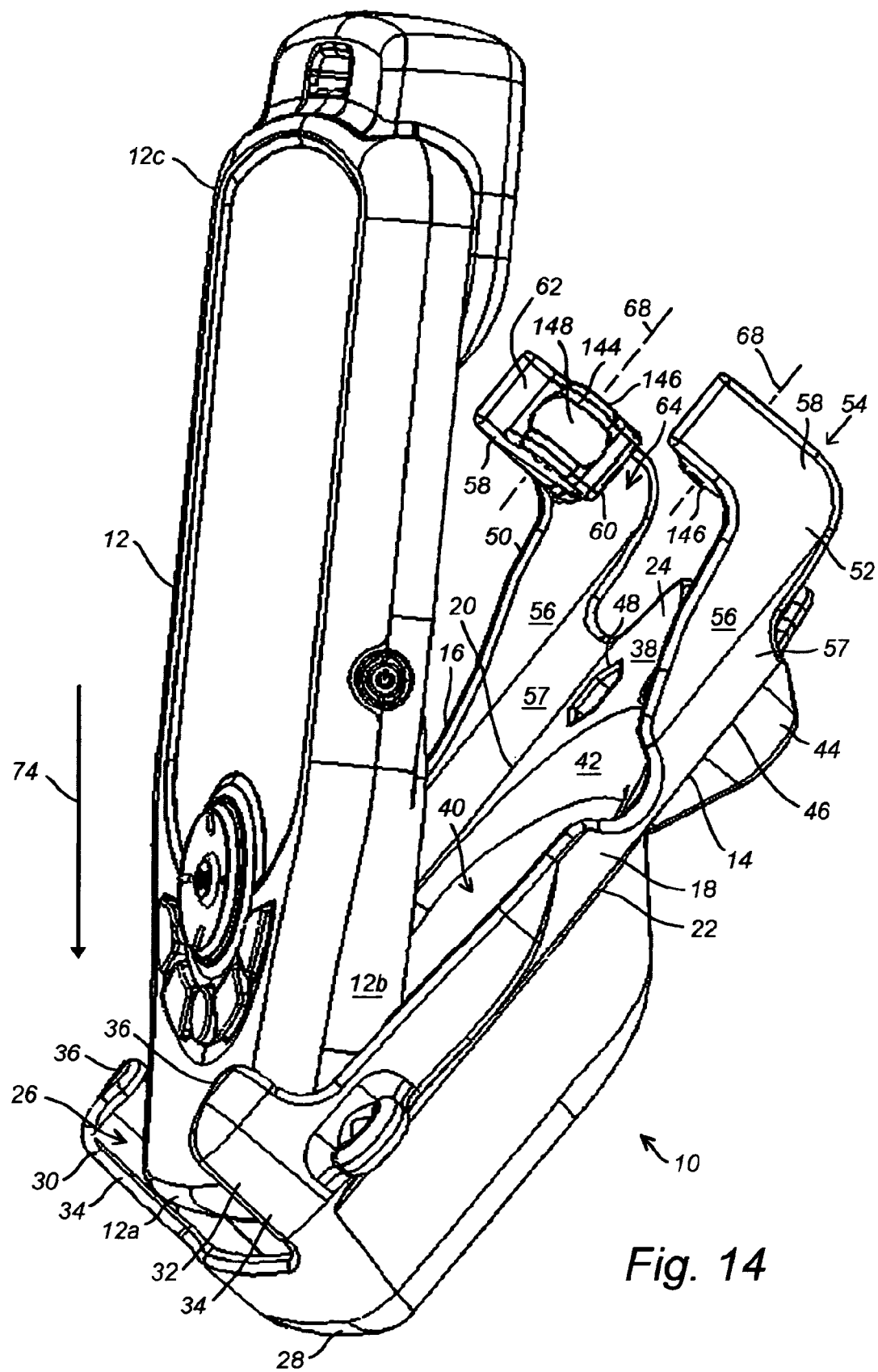
FIG. 14 illustrates a variation of the novel quick release portable device holder in combination with the portable cellular telephone or another portable electronic device, wherein a substantially spherical ball roller replaces one or more of the disk rollers.

FIG. 14 illustrates a variation of the novel quick release portable device holder 10 in combination with the portable cellular telephone or another portable electronic device 12, wherein one or more of the disk rollers 66 is replaced with a substantially spherical ball roller 144 suspended from the corresponding head portion 58 of each of the spring arm stems 56. As illustrated here by example and without limitation, each of the one or more ball rollers 144 is suspended in a suspension cage 146 embodied as a matching part-spherical ball socket. Each ball roller 144 is rotatably coupled within one of the matching ball socket cages 146. Each of the one or more socket cages 146 is extended from the interior surface 62 of the corresponding head portion 58. The socket cages 146 are structured to cause each ball roller 144 to rotate about the axis 68 that is substantially aligned with a corresponding one of the stems 56. A circumference 148 of each substantially spherical ball roller 144 is sufficiently large relative to its respective socket cage 146 as to be extended inwardly of the backing plane 14 into the interior volume 42 of the device holder 10 toward the opposing one of the arms 50 (or 52) farther than the corresponding socket cage 146, as more clearly illustrated in subsequent Figures.

As illustrated here, the device 12 is being either inserted into or removed from the device holder 10. Accordingly, as generally indicated by arrow 74, the base portion 12a of the device 12 is received into the receiver pocket 26 between the inwardly extending flanges 36 adjacent to the ends of the stems 34 of the receiver arms 30, 32 and the interior device resting surface 38 of the backing plane 14, while the backwardly protruding portion 12b of the device 12 is received into the cavity 40. At this stage, a head portion 12c of the device 12 is outside the device holder 10.

As generally indicated by arrow 76, the head portion 12c of the device 12 is rotated in a direction substantially normal to the interior device resting surface 38 of the backing plane 14 about the base portion 12a relative to the receiver pocket 26. Initially, the device 12 is rotated until opposing shoulder portions 12d of the device 12 on opposite sides of the head portion 12c contact the ball rollers 144 on the respective head portions 58 of the spring arm stems 56. At this stage, the head portion 12c of the device 12 is outside the device holder 10. Accordingly, the device 12 is being either inserted farther into or less removed from the device holder 10.

Figure 15:
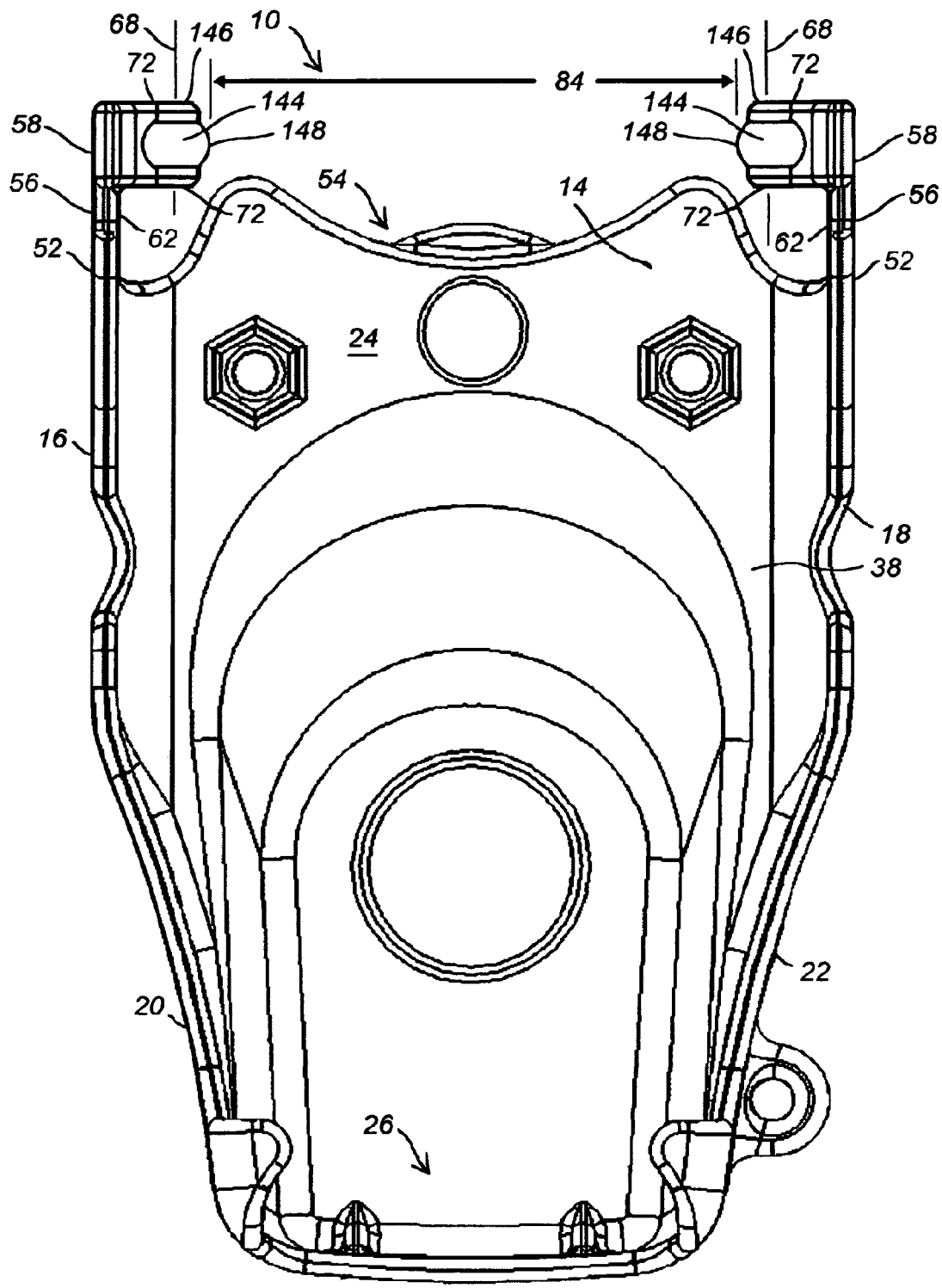
FIG. 15 illustrates the novel quick release portable device holder illustrated in FIG. 14 as seen from the front with the entrance end adjacent to the top of the page and an opposite receiver pocket adjacent to the bottom of the page.

FIG. 15 illustrates the device holder 10 as seen from the front with the entrance end 54 adjacent to the top of the page and the opposite receiver pocket 26 adjacent to the bottom of the page. The device holder 10 is shown here without the device 12. As illustrated here, the stems 56 of the spring arms 50, 52 extend out of both the respective side wall 16, 18 and the opposite sides 20, 22 of spine 24 of the backing plane 14. As illustrated here and discussed herein, each of the spring arms 50, 52 terminates in head portion 58, which includes one of the ball socket cages 146 extended from the interior surface 62 thereof and spaced away from the spine 24 of the backing plane 14.

Figure 16:
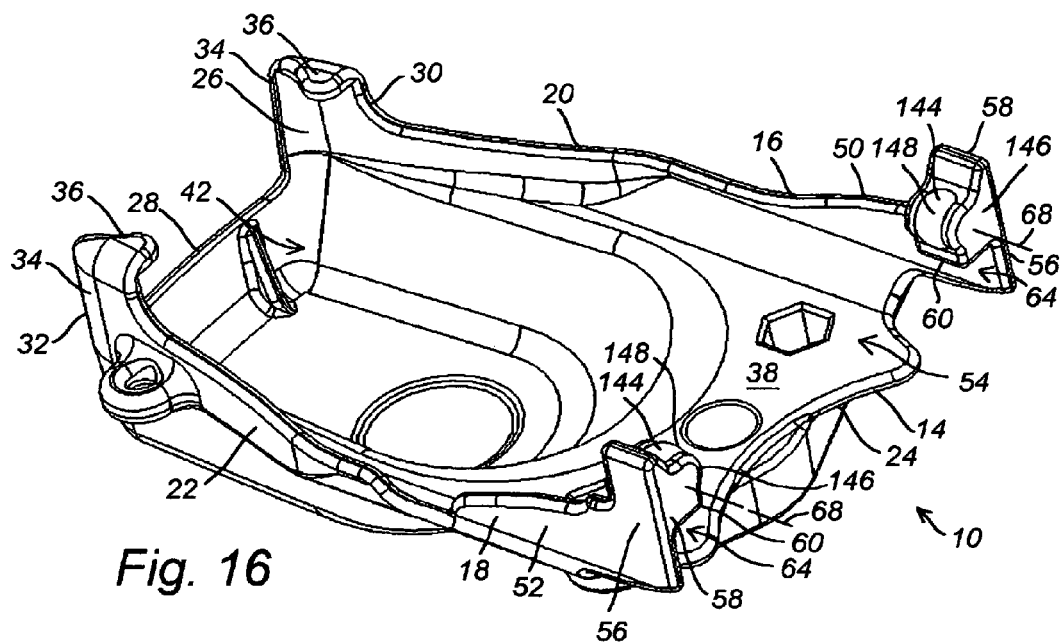
FIG. 16 is a pictorial view of the novel quick release portable device holder illustrated in FIG. 14 that illustrates retention tongues being formed integrally with respective ball socket cages on interior surfaces thereof substantially facing toward a device resting surface interior of a backing plane of the holder and spaced away therefrom.

FIG. 16 is a pictorial view of the device holder 10 that illustrates the retention tongues 60 being formed integrally with the respective ball socket cages 146 on interior surfaces thereof substantially facing toward the device resting surface 38 interior of the backing plane 14 and spaced away therefrom. The retention notches 64 are formed between the inwardly facing retention tongues 60 and the device resting surface 38 interior of the backing plane 14. One of the retention notches 64 is thus formed on each side of the device holder 10 adjacent to each of the opposing side walls 16, 18 between the retention tongue 60 of each spring arm 50, 52 and the interior device resting surface 38 of the backing plane 14.

Figure 17:
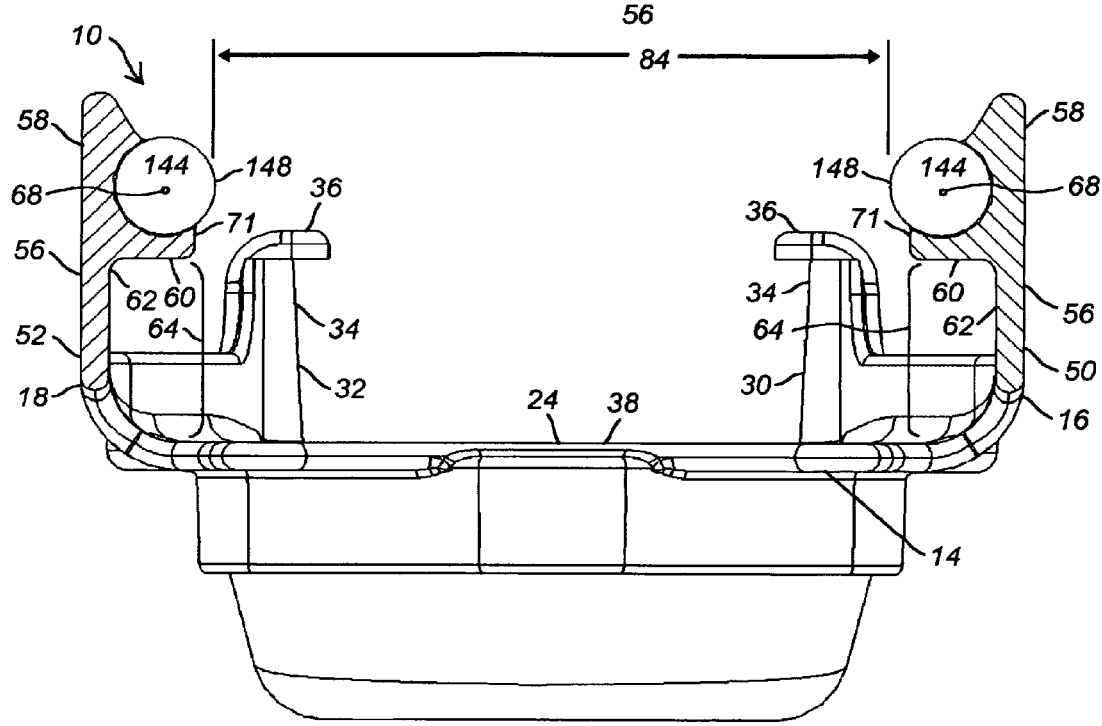
FIG. 17 is a partial cross-section view of the novel quick release portable device holder illustrated in FIG. 14 taken through the part-spherical ball socket cages as seen from the entrance end opposite from the receiver pocket.

FIG. 17 is a partial cross-section view of the device holder 10 taken through the part-spherical ball socket cages 146 suspending the respective substantially spherical ball rollers 144 as seen from the entrance end 54 opposite from the receiver pocket 26. The device holder 10 is shown here without the device 12. As illustrated here, the stems 56 of the spring arms 50, 52 extend out of both the respective side wall 16, 18 and the opposite sides 20, 22 of spine 24 of the backing plane 14. As illustrated here and discussed herein, each of the spring arms 50, 52 terminates in head portion 58, which includes respective ball socket cages 146 extended from the interior surface 62 thereof and spaced away from the spine 24 of the backing plane 14. As illustrated here, the retention tongues 60 are formed integrally with the ball socket cages 146 on interior surfaces thereof substantially facing toward the device resting surface 38 interior of the backing plane 14 and spaced away therefrom. The retention notches 64 are formed between the inwardly facing retention tongues 60 and the device resting surface 38 interior of the backing plane 14. One of the retention notches 64 is thus formed on each side of the device holder 10 adjacent to each of the opposing side walls 16, 18 between the retention tongue 60 of each spring arm 50, 52 and the interior device resting surface 38 of the backing plane 14.

Figure 18:
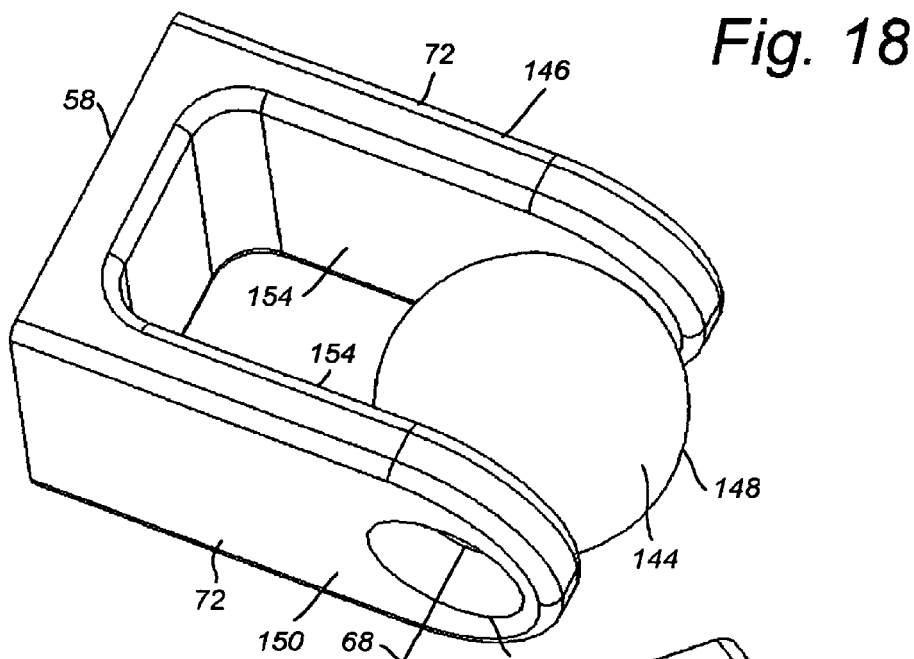
FIG. 18 illustrates one variation of the cage suspending the substantially spherical ball rollers.

FIG. 18 illustrates one variation of the cage 146 suspending the substantially spherical ball rollers 144. As illustrated here, the substantially spherical ball rollers 144 do not require the cage 146 to be embodied as matching part-spherical ball sockets. Rather, here the cage 146 is embodied as a fork formed of the pair of support flanges 72 extended from the interior surface 62 of the head portion 58 of each of the spring arm stems 56. As illustrated here by example and without limitation, the pair of spaced-apart support flanges 72 form tines of a fork that rotatably suspend one of the substantially spherical ball rollers 144. For example, each of the one or more substantially spherical ball rollers 144 is rotatably coupled in a fork 150 formed by the support flanges 72. The substantially spherical ball roller 144 is rotatably suspended between opposing cutouts 152 formed on an interior surface 154 of each flange 72. By example and without limitation, the opposing cutouts 152 are formed as divots or indentations on the interior surface 154 of each flange 72. Here, the cutouts 152 are extended to form apertures through each flange 72 of the fork cage 150, and the substantially spherical ball roller 144 is rotatably suspended between the flanges 72 in the aperture cutouts 152. Each of the one or more fork cages 150 is extended from the interior surface 62 of the corresponding head portion 58. The fork cages 150 are structured to cause each substantially spherical ball roller 144 to rotate about the axis 68 that is substantially aligned with a corresponding one of the stems 56. The circumference 148 of each substantially spherical ball rollers 144 is sufficiently large relative to its respective fork cage 150 as to be extended inwardly of the backing plane 14 into the interior volume 42 of the device holder 10 toward the opposing one of the arms 50 (or 52) farther than the corresponding fork cage 150, as clearly illustrated here.

Figure 19:
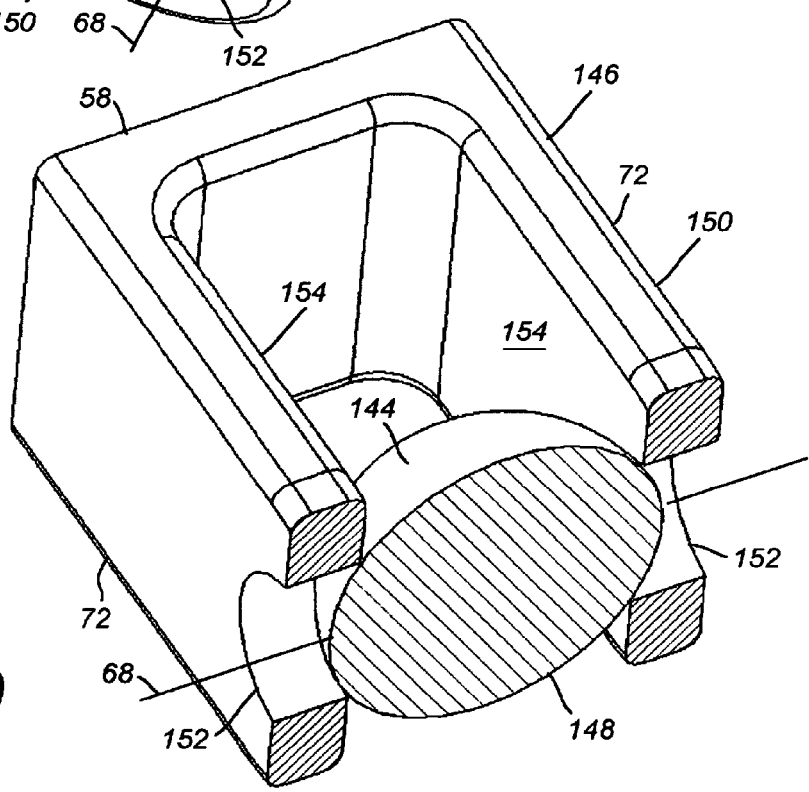
FIG. 19 is a cross-section of the cage illustrated in FIG. 18 taken through the substantially spherical ball roller and the flanges of the cage.

FIG. 19 is a cross-section taken through the substantially spherical ball roller 144 and the flanges 72 of the cage 146, which is embodied here as the fork cage 150. The cutouts 152 are illustrated here as apertures extended from the respective interiors surface 154 through each flange 72 of the fork cage 150.

Figure 20:
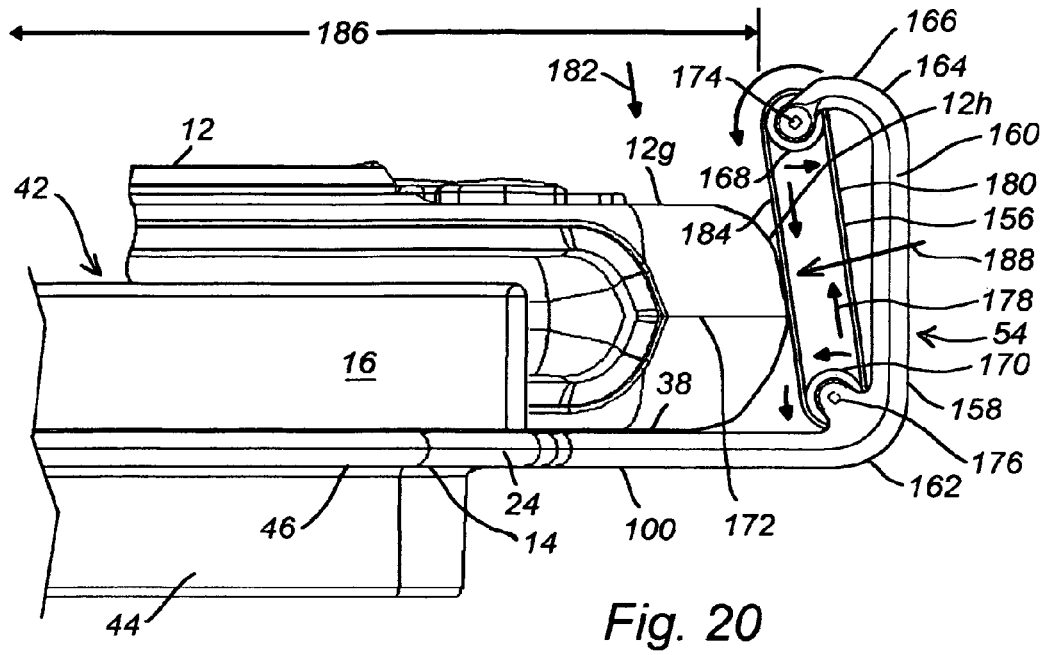
FIG. 20 illustrates a variation of the novel quick release portable device holder wherein a belt and roller mechanism replaces either the disk rollers or the spherical ball rollers for easing the device into and out of the device holder without scaring or otherwise damaging the soft and impressionable materials used in forming all or at least part of their external cases.

FIG. 20 illustrates a variation of the novel quick release portable device holder 10 wherein a belt-and-roller mechanism 156 replaces one or more of either the disk rollers 66 or the spherical ball roller 144 for easing the device 12 into and out of the device holder 10 without scaring or otherwise damaging the soft and impressionable materials used in forming all or at least part of their external cases. As illustrated here by example and without limitation, the belt-and-roller mechanism 156 is mounted on an arm 158 which is optionally either relatively resiliently flexible or substantially rigid as a matter of design choice.

The arm 158 is formed by example and without limitation as having a stem portion 160 projected from the spine 24 of the backing plane 14 in a root portion 162 and extended outwardly therefrom. The arm 158 is illustrated as terminating in head portion 164 that is spaced away from the spine 24 of the backing plane 14. Each head portion 164 is formed with a tongue 166 extended therefrom inwardly of the backing plane 14 and generally facing toward the device resting surface 38 interior of the backing plane 14 and is spaced away therefrom.

The belt-and-roller mechanism 156 is formed of a pair of distal and proximate rollers 168, 170 spaced apart on the head portion 164 and root portion 162 of the arm 158 such that the first distal roller 168 is spaced away from the spine 24 of the backing plane 14 above the device 12, and the second proximate roller 170 is adjacent to the spine 24 at least below a line of maximum extension 172 of the device 12. Each of the distal and proximate rollers 168, 170 is oriented such that it is rotatable about a respective distal and proximate axis 174, 176 substantially aligned with a corresponding one of the stems 160.

As illustrated by arrows 178, a belt 180 is movable on the distal and proximate rollers 168, 170, for example, in response to contact with the device 12 being pushed into (or pulled out of) the holder 10, as indicated by arrow 182. The belt 180 is optionally either elastic or substantially inelastic. For example, the belt 180 is any suitable material, including but not limited to rubber or other elastomer, leather, fabric or metal. A surface 184 of the belt 180 is optionally a highly frictional surface, whereby the belt 180 more effectively moves with the device 12.

Movement of the belt 180 rotates both the distal and proximate rollers 168, 170 about respective distal and proximate axes 174, 176 such that the belt surface 184 remains in contact with the device 12. Therefore, according to well-known physical laws, the belt 180 remains substantially stationary relative to the device 12 as it is being pushed into (or pulled out of) the holder 10, as indicated by arrow 182. The relatively stationary belt 180 thus cannot scuff, scar or otherwise damage the soft and impressionable materials used in forming all or at least part of the external case of the device 12.

As illustrated here by example and without limitation, the first distal roller 168 is positioned to avoid the device 12 as it is being pushed into (or pulled out of) the holder 10. For example, a roller-to-receiver pocket spacing 186 between the first distal roller 168 and the opposing receiver pocket 26 is sufficient to permit the device 12 to be received into the holder 10 without significantly engaging the first distal roller 168. The second proximate roller 170 is also positioned to avoid contact with the device 12. As illustrated here, the second proximate roller 170 is supported on the root portion 162 of the arm 158 adjacent to the spine 24 of the backing plane 14 but spaced outwardly of the receiver pocket 26 sufficiently to avoid contact with the device 12. Thus positioned the pair of distal and proximate rollers 168, 170 cause the belt 180 to bear on the device 12 for applying a compression force that pushes the device 12 into the receiver pocket 26, as indicated by arrow 188. Accordingly, tension in the belt 180 retains the device 12 in the receiver pocket 26 of the holder 10. The rollers 168, 170 do not engage the device 12 and therefore cannot damage its surface.

Figure 21:
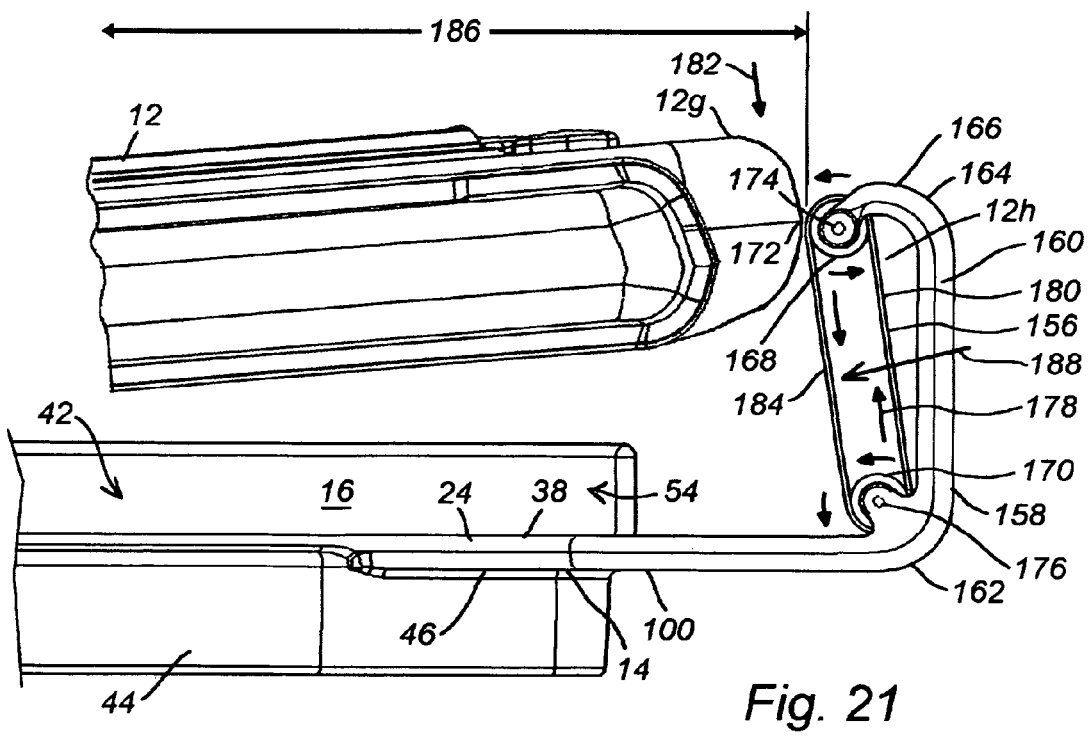
FIG. 21 illustrates the device as it is being pushed into (or pulled out of) the novel quick release portable device holder having the belt and roller mechanism.

FIG. 21 illustrates the device 12 as it is being pushed into (or pulled out of) the holder 10 having the belt-and-roller mechanism 156. Here, the first distal roller 168 is clearly shown to avoid contact with the device 12 during insertion into or removal from the receiver pocket 26 of the holder 10.

Figure 22:
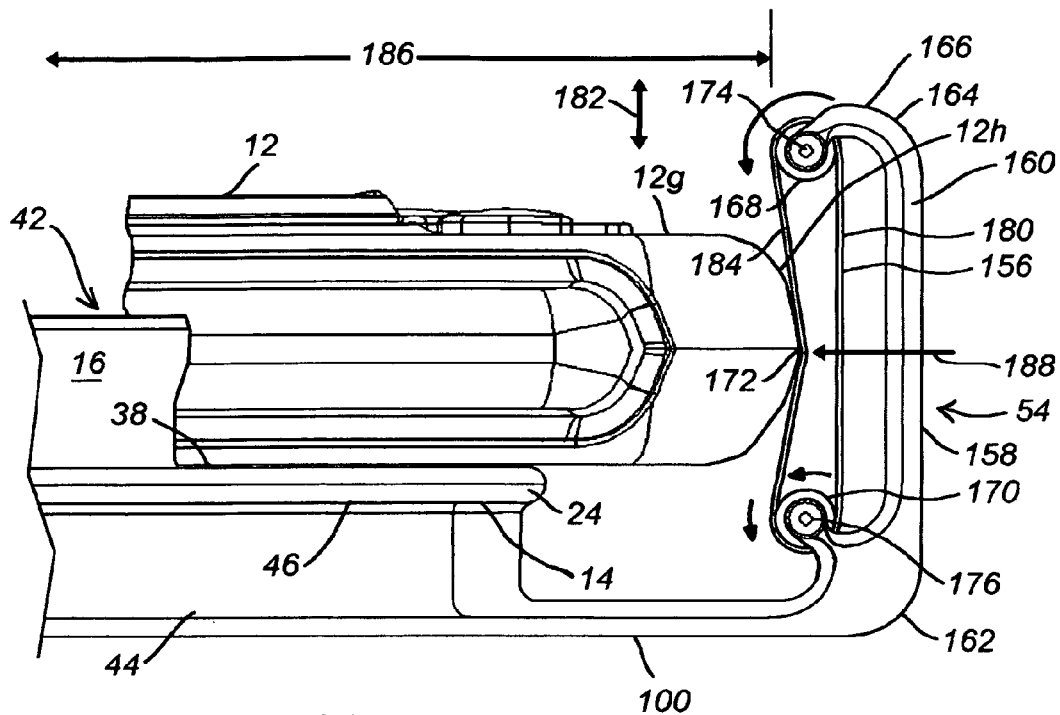
FIG. 22 illustrates a variation of the belt-and-roller mechanism of the novel quick release portable device holder wherein the arm supporting the belt mechanism further aligns the first and second rollers of the belt mechanism substantially perpendicular to a spine portion of the holder's backing plane.

FIG. 22 illustrates a variation of the belt-and-roller mechanism 156 of the novel quick release portable device holder 10 wherein the arm 158 aligns the first distal and second proximate rollers 168, 170 substantially perpendicular to the spine portion 24 of the backing plane 14. The arm 158 positions the first distal roller 168 to avoid the device 12 as it is being pushed into (or pulled out of) the holder 10. The second proximate roller 170 is also positioned to avoid contact with the device 12. As illustrated here, the second proximate roller 170 is supported on the root portion 162 of the arm 158 below the spine 24 of the backing plane 14 where it is positioned to avoid contact with the device 12. Thus positioned the rollers 168, 170 cause the belt 180 to bear on the device 12 for applying a compression force that pushes the device 12 into the receiver pocket 26, as indicated by arrow 188. Accordingly, tension in the belt 180 retains the device 12 in the receiver pocket 26 of the holder 10. The distal and proximate rollers 168, 170 do not engage the device 12 and therefore cannot damage its surface.

Figure 23:
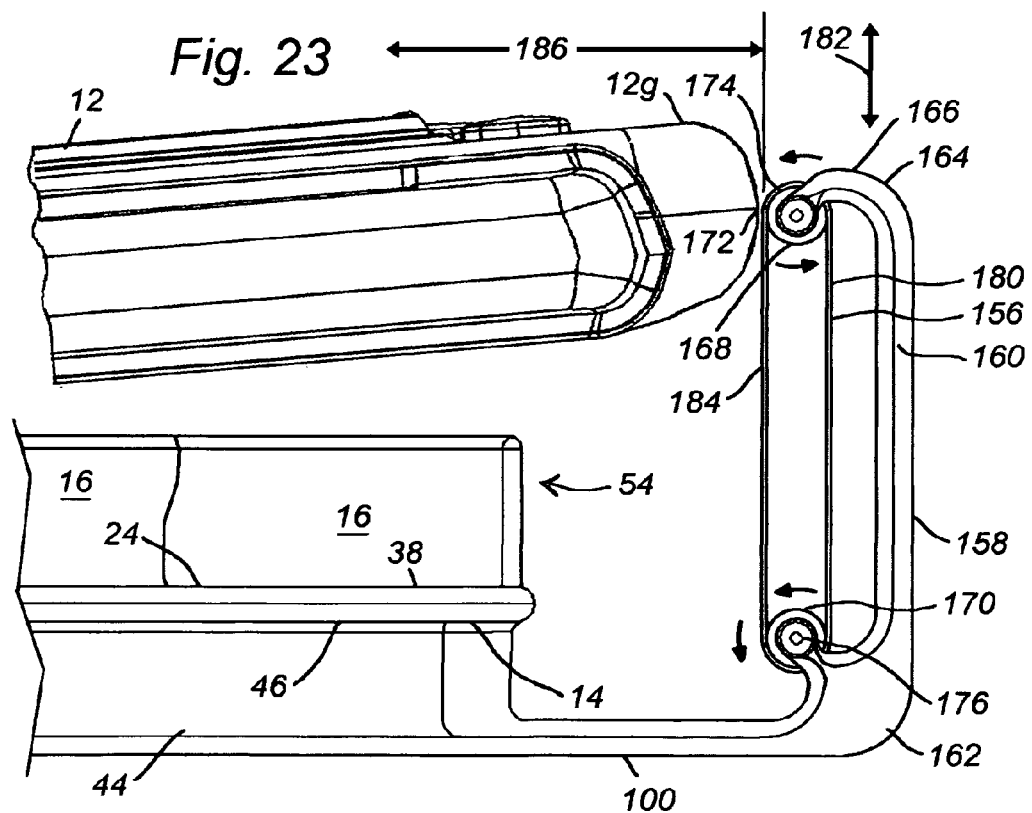
FIG. 23 illustrates the device as it is being pushed into (or pulled out of) the novel quick release portable device holder having the belt-and-roller mechanism, wherein the first distal roller is clearly shown to avoid contact with the device during insertion into or removal from the receiver pocket of the holder.

FIG. 23 illustrates the device 12 as it is being pushed into (or pulled out of) the holder 10 having the belt-and-roller mechanism 156. Here, the first distal roller 168 is clearly shown to avoid contact with the device 12 during insertion into or removal from the receiver pocket 26 of the holder 10.

Figure 24:
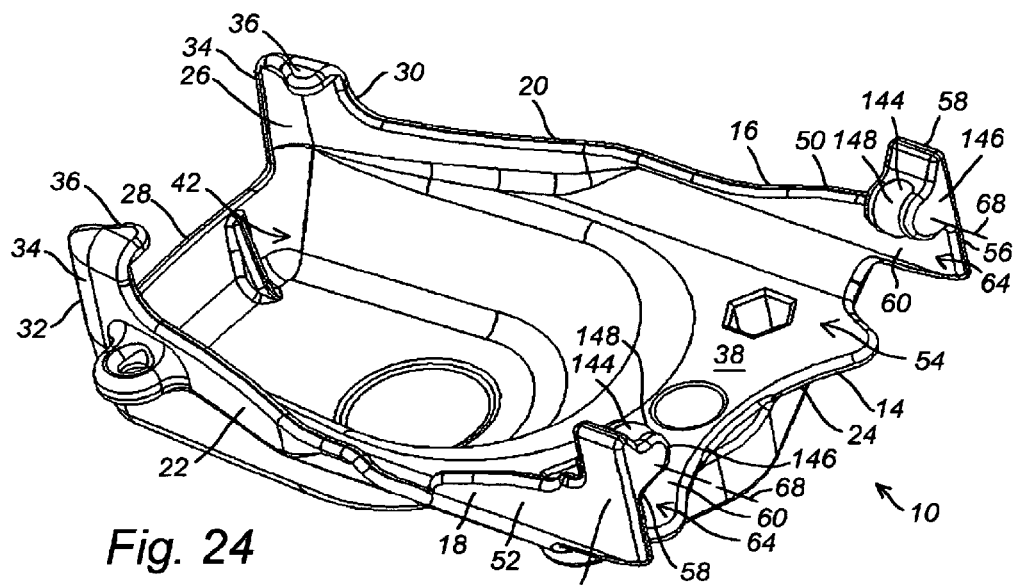
FIG. 24 is a pictorial view of the novel quick release portable device holder that illustrates the support flanges being formed on the head portion of each of the spring arm stems and extended from an interior surface thereof without the retention tongues.

FIG. 24 is a pictorial view of the device holder 10 that illustrates the support flanges 72 being formed on the head portion 58 of each of the spring arm stems 56 and extended from the interior surface 62 thereof without the retention tongues 60. The structure disclosed is applicable using either the disk roller 66 or the substantially spherical ball roller 144. Accordingly, either of the disk roller 66 or the substantially spherical ball roller 144 (shown) is suspended from the support flanges 72 as disclosed herein. Furthermore, the disk roller 66 or the ball roller 144 is suspended in a position for forming the device retention notch 64 between the circumference 70 or 148 (shown) of the respective disk roller 66 or ball roller 144 and the interior device resting surface 38 of the backing plane 14 between the opposing side walls 16, 18 thereof. Thus, one of the retention notches 64 is formed on opposite sides of the device holder 10 adjacent to each of the opposing side walls 16, 18 between each disk roller 66 or ball roller 144 and the interior device resting surface 38 of the backing plane 14, which is more clearly shown in subsequent Figures.

The disk rollers 66 or ball rollers 144 are positioned on the respective head portions 58 to engage the device's shoulder portions 12d before engagement thereof by the supporting flanges 72. The disk rollers 66 or ball rollers 144 are set sufficiently far from the device resting surface 38 interior of the backing plane 14 to permit the shoulder portions 12d of the device 12 to be received into the retention notches 64 formed thereby. Accordingly, the disk rollers 66 or ball rollers 144 do double duty: the disk rollers 66 or ball rollers 144 operate to roll the device 12 both into and out of the receiver pocket 26 of the device holder 10, and the disk rollers 66 or ball rollers 144 also operate as the retention tongues for retaining the device 12 within the interior volume 42 of the device holder 10. In this regard, the disk rollers 66 or ball rollers 144 optionally include a smooth and yielding resiliently compressible surface at the respective circumference 70 or 148 thereof. For example, the disk rollers 66 or ball rollers 144 are either formed throughout of a rubber, such as a silicone rubber, or another resilient elastomer, else the disk rollers 66 or ball rollers 144 are formed of a rigid core 190 covered in a sheath 192 of such smooth and yielding resiliently compressible elastomer, as more clearly illustrated in FIG. 25. The resiliently compressible elastomer protects the device 12 during insertion into or removal from the receiver pocket 26 of the holder 10, as well as during residence in the receiver pocket 26 while being retained by the disk rollers 66 or ball rollers 144.

Figure 25:
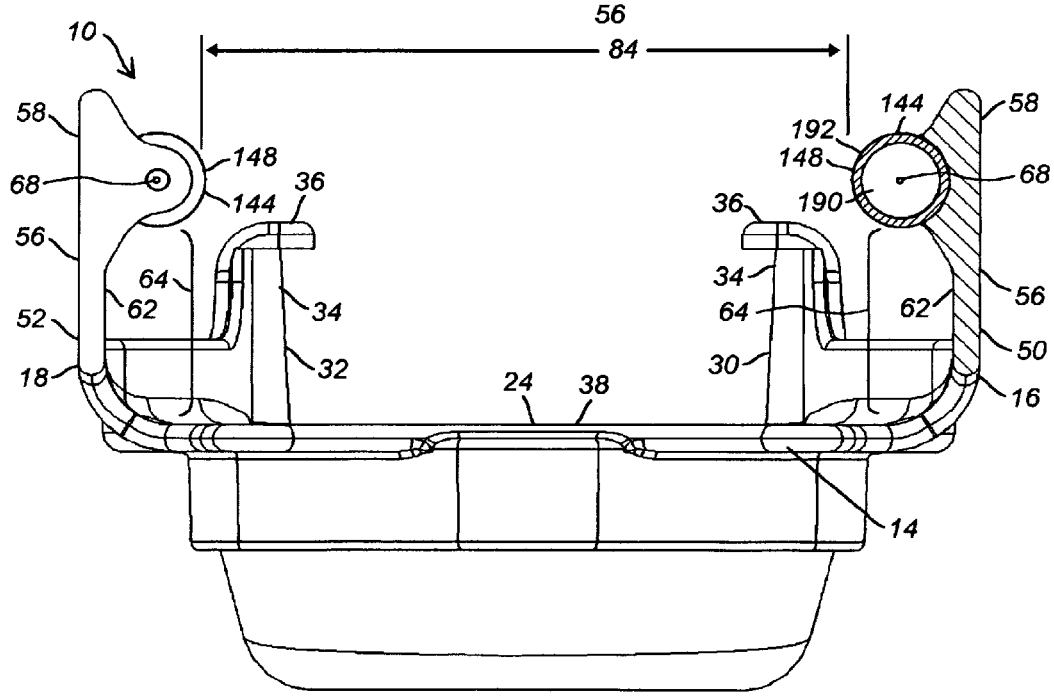
FIG. 25 is a partial cross-section view of the novel quick release portable device holder taken through one of the fork cages suspending the respective substantially spherical ball rollers as seen from the entrance end opposite from the receiver pocket.

FIG. 25 is a partial cross-section view of the device holder 10 taken through one of the fork cages 150 suspending the respective substantially spherical ball rollers 144 as seen from the entrance end 54 opposite from the receiver pocket 26. The device holder 10 is shown here without the device 12. As illustrated here, the disk rollers 66 or ball rollers 144 are positioned to operate to roll the device 12 both into and out of the receiver pocket 26 of the device holder 10, and also to operate as the retention tongues for retaining the device 12 within the interior volume 42 of the device holder 10.

Figure 26:
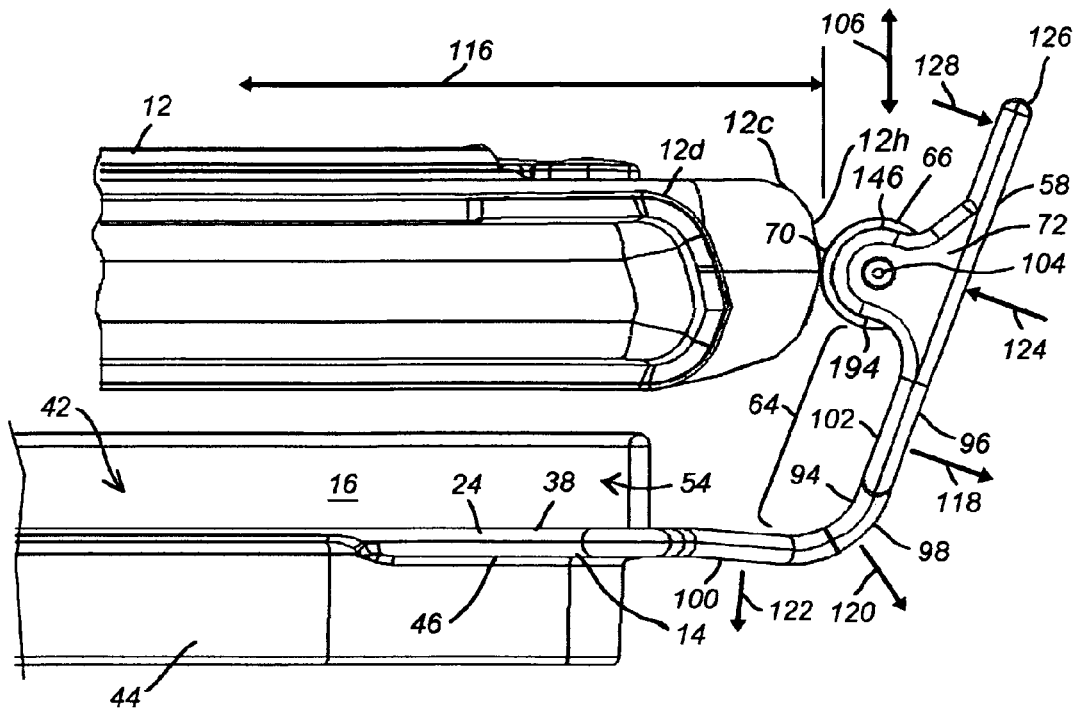
FIG. 26 illustrates the novel quick release portable device holder having the disk rollers and further shows the intermediate step of inserting the device into the device holder, or subsequently removing it therefrom.

FIG. 26 illustrates the device holder 10 having the disk rollers 66 and shows the intermediate step of inserting the device 12 into the device holder 10, or subsequently removing it therefrom. Here, the disk roller 66 forms the retention notches 64 with the device resting surface 38 interior of the backing plane 14. Accordingly, the device retention tongue 60 is deleted from the interior surface 62 of the head portion 58. The support flanges 72 of the cage 146 that rotatably suspend the corresponding roller 66 (or ball roller 144) therebetween are formed with a surface 194 proximate to the device resting surface 38 that is recessed relative to the disk roller 66 (or 144) in order to clear the head portion 12c of the device 12 during insertion into and removal from the holder 10.

As discussed herein, the device holder 10 is formed of a substantially rigid material, such as an injection moldable plastic, as discussed herein. However, as further discussed herein, in thin sections the substantially rigid material is resiliently flexible. Accordingly, the thickness 108 is selected for the resiliently flexible latching or "spring" arm 94 relative to other parameters, including for example the length and width dimensions 110, 112 of the stem portion 96, as discussed herein, as well as dimensions of the curved root portion 98 and the resiliently flexible base portion 100, if present. Appropriate selection of these parameters determined using known mechanical design principles and tools in combination with material selection results in spring arm 94 being stiff but sufficiently resiliently flexible as to form torsion springs having the head portion 58 adjacent to its terminus. The spring arm 94 is resiliently spreadable to increase the initial relaxed roller-to-receiver pocket spacing 114 between the disk roller 66 and the opposing receiver pocket 26 (shown in FIG. 12) to an intermediate expanded roller-to-receiver pocket spacing 116 spread sufficiently wide to pass therebetween the head portion 12c of the device 12.

As generally indicated by arrow 118, the stem portion 96 of the spring arm 94 flexes outward of the spine 24 of the backing plane 14 to expanded roller-to-receiver pocket spacing 116 sufficiently wide for the shoulder portions 12d of the device 12 to pass the disk roller 66, as generally indicated by arrow 106. Optionally, as generally indicated by arrow 120, the curved root portions 98 of the spring arm 94 is also structured to flex outward of the spine 24 of the backing plane 14 simultaneously with the flexing stem portion 96, whereby the curved root portion 98 is also involved in expanding the relaxed roller-to-receiver pocket spacing 114 to the expanded roller-to-receiver pocket spacing 116 necessary for passing the head portion 12c of the device 12 between the receiver pocket 26 and opposing disk roller 66. Accordingly, involvement of the root portions 98 in spreading the spring arm 94 is also contemplated and may be included as a matter of design choice without deviating from the scope and intent of the present invention.

Additionally, as generally indicated by arrow 122, the necked-down base portion 100 of the spring arm 94 is also structured to flex outward of the spine 24 of the backing plane 14 simultaneously with the flexing stem and curved root portions 96 and 98, whereby the necked-down base portion 100 is also involved in expanding the relaxed roller-to-receiver pocket spacing 114 to the expanded roller-to-receiver pocket spacing 116 between the receiver pocket 26 and opposing disk roller 66. Accordingly, involvement of the necked-down base portion 100 in spreading the spring arm 94 is also contemplated and may be included as a matter of design choice without deviating from the scope and intent of the present invention.

As illustrated, during the insertion (and removal) process, only the disk roller 66 contacts the head portion 12*c* of the device 12. As indicated by arrow 124, spring pressure of the expanded spring arm 94 causes the disk roller 66 to substantially continuously follow contours 12*h* of device head portion 12*c*. The circumference 70 of the disk roller 66 is sufficiently large relative to other components the head portion 58 generally such that contact with the device head portion 12*c* is effectively restricted to only the disk roller 66 during both the insertion and removal processes. The disk roller 66 remains in continuous contact with the device head portion 12*c* both during and after insertion of the device into the holder 10 and seated in the receiver pocket 26 against the device resting surface 38 interior of the backing plane 14. Thus, the disk roller 66 protects the soft and impressionable elastomer materials of the device head portion 12*c* from any contact with the unforgiving rigid material of the head portion 58 generally so that scratching and other potential damage to the device 12 is avoided.

Figure 27:
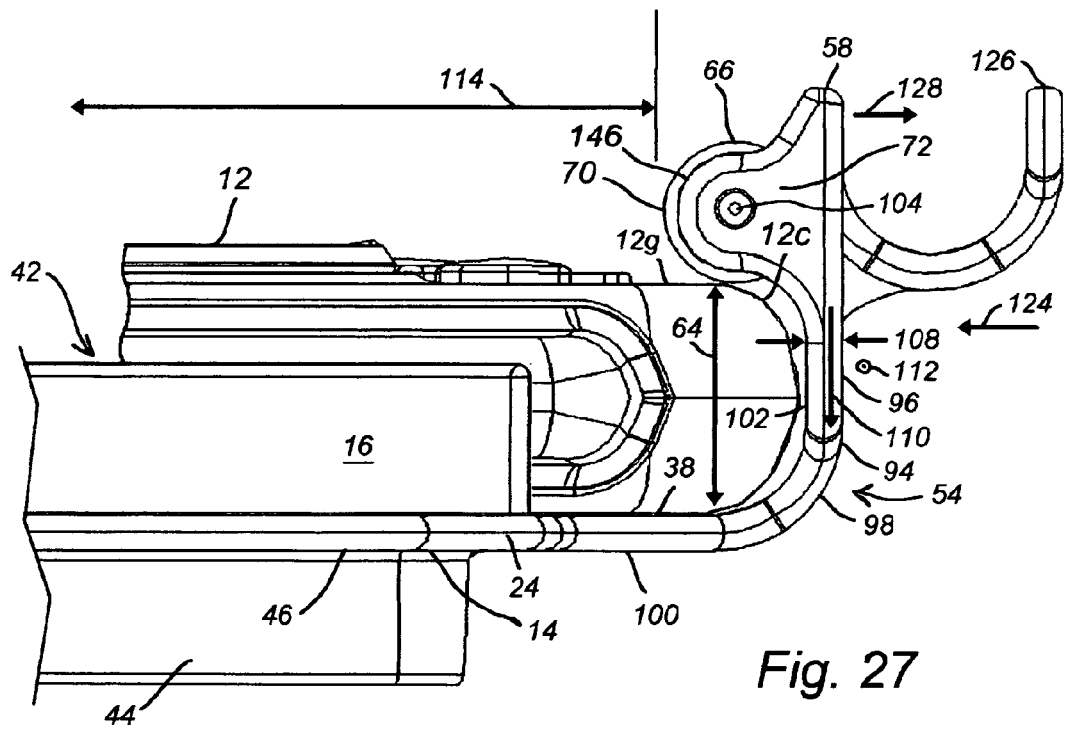
FIG. 27 illustrates the spring arm of the novel quick release portable device holder contracted from an shoulder-width expanded roller-to-receiver pocket spacing needed to receive the device to the initial relaxed roller-to-receiver pocket spacing.

FIG. 27 illustrates the spring arm 94 contracted from the shoulder-width expanded roller-to-receiver pocket spacing 116 needed to receive the device 12 to the initial relaxed roller-to-receiver pocket spacing 114. As discussed herein, the spring arm 94 contracts automatically due to spring pressure, as indicated by arrow 124. The spring arm 94 operates by spring tension caused by bending deflection of the stem portion 96 away the spine 24 of the backing plane 14. Additional spring tension may be caused by the involvement of the root portion 98 in spreading the spring arm 94 as a matter of design choice without deviating from the scope and intent of the present invention. The necked-down base portion 100 may also be incorporated for adding spring tension into the spreading the spring arm 94 as a matter of design choice also without deviating from the scope and intent of the present invention. Accordingly, once the device 12 is past the disk roller 66, the head portion 58 snaps back into its relaxed position with its interior surface 62 adjacent to the face portion 12*g* of the device head portion 12*c*. The disk roller 66 (or ball roller 144) thus reforms the retention notches 64 with the device resting surface 38 interior of the backing plane 14. Thereafter, the device head portion 12*c* is captured within the retention notch 64, and the device 12 is effectively retained in the interior volume 42 of the device holder 10.

The device 12 is released from the device holder 10 in reverse of the insertion described herein by forcing the device head portion 12*c* away from the backing plane 14, as discussed herein. Pressure of the head portion 12*c* against the disk roller 66 forces the head 58 to flex outwardly away from the backing plane 14, whereupon the head portion 12*c* is rolled through the resulting expanded roller-to-receiver pocket spacing 116.

Incorporation of the disk roller 66 (or ball roller 144) with the cage 146 on the head portion 58 in the spring arm 94 similarly operates to either retract the device 12 into the holder 10, or to eject it therefrom as a function the position of the axis 104 of the disk roller 66 relative to the maximum of the contour 12*h* of the head portion 12*c* of the device 12.

Optionally, the head 58 is formed with the handle 126 external of the interior volume 42 of the device holder 10. The handle 126 is operable by the user for exerting a force on the spring arm 94 outwardly away from the backing plane 14, as generally indicated by arrow 128. The outward force generally indicated by arrow 109 flexes the stem portion 96 of the spring arm 94 outward of the spine 24 of the backing plane 14, as generally indicated in FIG. 26 by arrow 118, to expanded roller-to-receiver pocket spacing 116 sufficiently wide for the shoulder portions 12*d* of the device 12 to pass the disk roller 66, as generally indicated by arrow 106, whereupon the head portion 12*c* is rolled through the resulting expanded inter-roller spacing 116.

Optionally, the axes 68 or 104 of the disk rollers 66 (or ball rollers 144) are oriented differently relative to the backing plane 14 as a function of the peculiar shape of the device 12 intended for use with the novel device holder 10.

Figure 28:
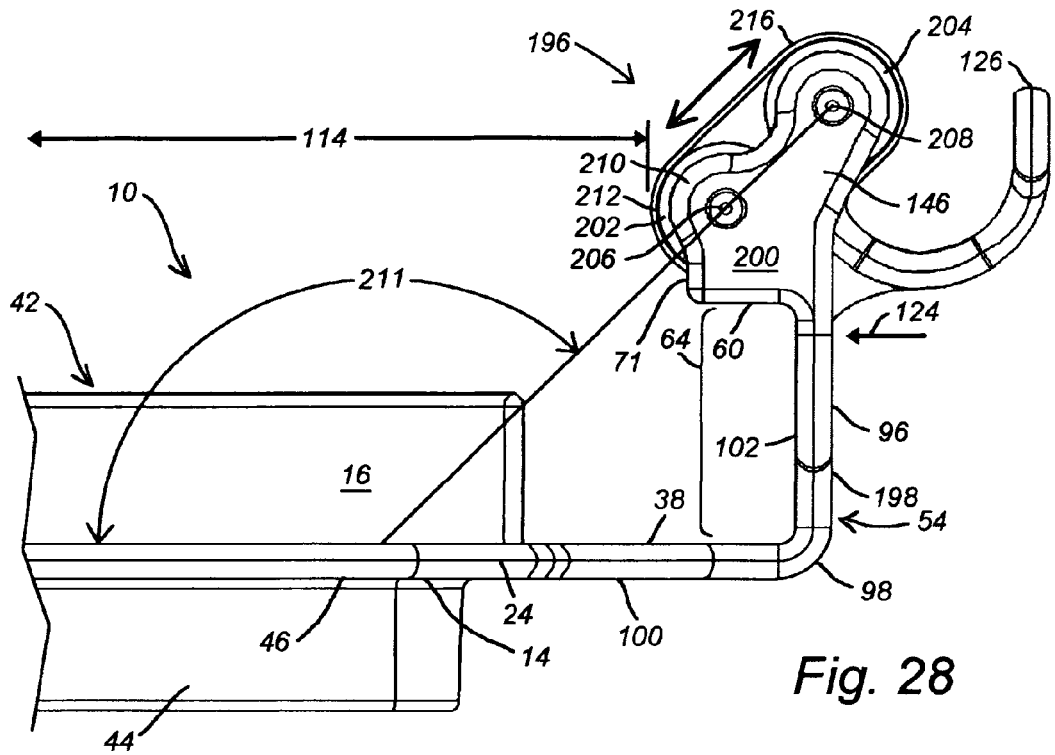
FIG. 28 illustrates another variation of the novel quick release portable device holder, wherein a belt-and-roller conveyer mechanism replaces one or more of either the disk rollers or the spherical ball roller for easing the device into and out of the device holder without scaring or otherwise damaging the soft and impressionable materials used in forming all or at least part of their external cases.

FIG. 28 illustrates another variation of the novel quick release portable device holder 10 wherein a belt-and-roller conveyer mechanism 196 replaces one or more of either the disk rollers 66 or the spherical ball roller 144 for easing the device 12 into and out of the device holder 10 without scaring or otherwise damaging the soft and impressionable materials used in forming all or at least part of their external cases. The belt-and-roller mechanism 196 is useful for conveying into the device holder 10 the device 12 of a design having more rectangular contours 12*h*. As illustrated here by example and without limitation, the belt-and-roller mechanism 196 is mounted on a spring arm 198 which is optionally either relatively resiliently flexible or substantially rigid as a matter of design choice.

The spring arm 198 is formed by example and without limitation as having the resiliently flexible stem portion 96 projected from the spine 24 of the backing plane 14 in a curved root portion 98 and extending substantially normal to the spine 24 away from the device resting surface 38 interior of the backing plane 14, as discussed herein. The spring arm 198 is illustrated as terminating in a head portion 200 that is spaced away from the spine 24 of the backing plane 14. Each head portion 200 is formed with the device retention tongue 60 extended from an interior surface 62 thereof. Each head portion 200 is also formed with the suspension cage 146 suspending one or more of each of a pair of proximate and distal rollers 202, 204 spaced apart on the head portion 200 and rotatably coupled thereto with each of the rollers 202, 204 being oriented such that it is rotatable about its respective axis 206, 208 substantially aligned with the corresponding stem 96. The proximate roller 202 is suspended in a portion 210 of the suspension cage 146 proximate to the interior volume 42 of the device holder 10, whereby the initial relaxed roller-to-receiver pocket spacing 114 is established between the proximate roller 202 and the opposing receiver pocket 26 (shown in FIG. 12).

The respective axis 206, 208 of proximate and distal rollers 202, 204 supporting the conveyer belt 216 are inclined from the interior device resting surface 38 of the backing plane 14 within in a range of orientation angles 211 that is significantly rotated from parallel toward the backing plane 14, i.e., significantly less than 180 degrees. By example and without limitation, the orientation angle 211 of the conveyer belt 216 is approximately 135 degrees from the interior device resting surface 38 of the backing plane 14, or another angle that is significantly rotated toward the backing plane 14 away from parallel therewith.

Furthermore, the proximate and distal rollers 202, 204 are each spaced farther from the backing plane 14 than the corresponding retention tongue 60. The proximate portion 210 of the suspension cage 146 thus suspends the proximate roller 202 in a manner to be presented to the device 12 rather than the retention tongue 60. Therefore, the proximate roller 202 has a circumference 212 that is sufficiently large relative to the head portion 200 as to be extended inwardly of the backing plane 14 into the interior volume 42 of the device holder 10 toward the receiver pocket 26, or the opposing one of the arms 50 or 52, farther than the corresponding retention tongue 60. Accordingly, the retention tongue 60 includes set-back 71 from the circumference 212 of the proximate roller 202 large enough for the retention tongue 60 to remain spaced away from contact with the device 12 during both insertion and subsequent removal, as more clearly illustrated in subsequent Figures.

Additionally, the suspension cage 146 is formed with a distal portion 214 suspending the one or more distal rollers 204 relative to the one or more proximate rollers 202 in a position upward of the device resting surface 38 interior of the backing plane 14 and outward of interior volume 42 of the device holder 10. The positioning of the distal rollers 204 relative to the proximate rollers 202 causes the belt-and-roller mechanism 196 to be oriented upward of the backing plane 14 and outward of the device holder's interior volume 42.

A conveyer belt 216 is movable on the proximate and distal rollers 202, 204, for example, in response to contact with the device 12 being pushed into (or pulled out of) the holder 10. The conveyer belt 216 effectively extends the reach of proximate roller 202 for engaging the sharper corner contour 12h of a more rectangular device 12.

Figure 29:
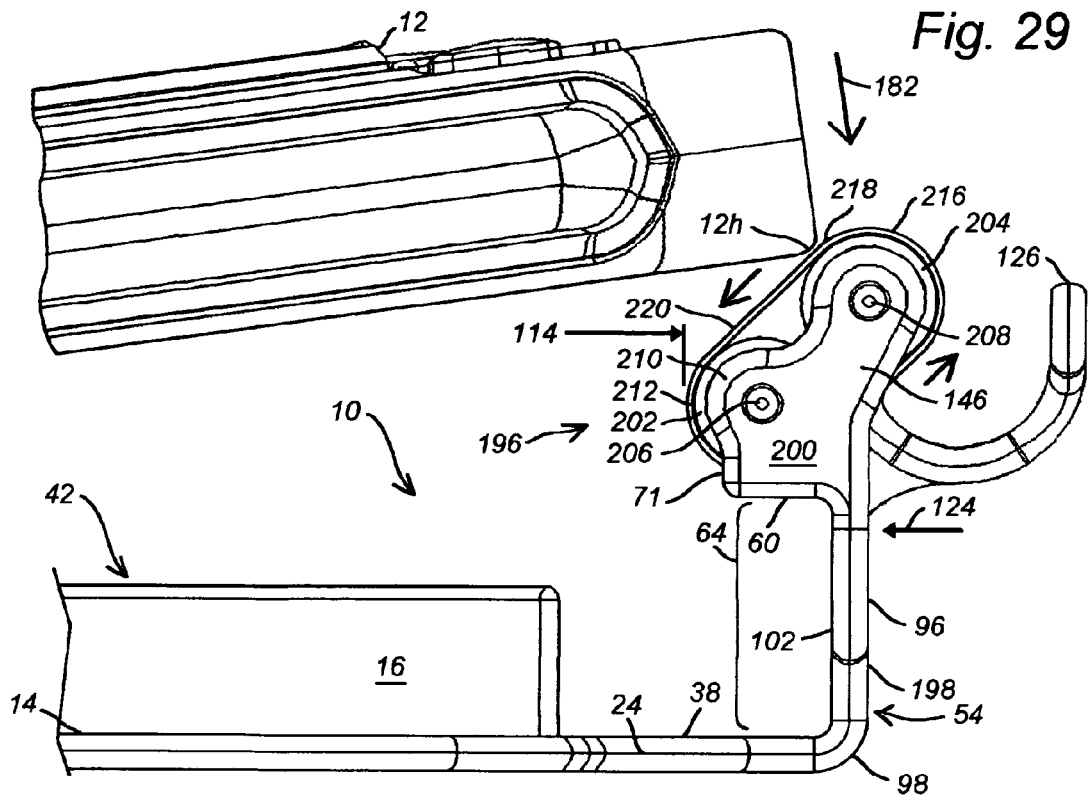
FIG. 29 illustrates the device being inserted into the novel quick release portable device holder, wherein a more rectangular corner contour of the device engages the conveyer belt before entry.

FIG. 29 illustrates the device 12 being inserted into the holder 10, wherein the more rectangular corner contour 12h of device 12 engages the conveyer belt 216 before entry. The conveyer belt 216 is movable on the proximate and distal rollers 202, 204, for example, in response to contact with the device 12 being pushed into the holder 10, as indicated by arrow 182. The more rectangular corner contour 12h of device 12 engages a leading portion 218 of the angularly inclined conveyer belt 216. The conveyer belt 216 is thus oriented to lead the corner contour 12h of device 12 into the holder 10. In contrast, the corner contour 12h of device 12 would engage a portion of either the disk rollers 66 or the spherical ball roller 144 alone nearly parallel (about 180 degree) to interior device resting surface 38 of backing plane 14. Engaging either the disk rollers 66 or the spherical ball roller 144 at such a flat angle would tend to stall the device 12. Here, the relative inclination of the proximate and distal rollers 202, 204 orients the belt-and-roller mechanism 196 in a manner that is inclined toward the interior device resting surface 38 of the backing plane 14. This inclination makes the belt-and-roller mechanism 196 useful for conveying into the more rectangular contours 12h of the device 12 into the device holder 10.

The conveyer belt 216 is optionally either elastic or substantially inelastic. For example, the conveyer belt 216 is any suitable material, including but not limited to rubber or other elastomer, leather, fabric or metal. A surface 220 of the conveyer belt 216 is optionally a highly frictional surface, whereby the conveyer belt 216 more effectively moves with the device 12.

Figure 30:
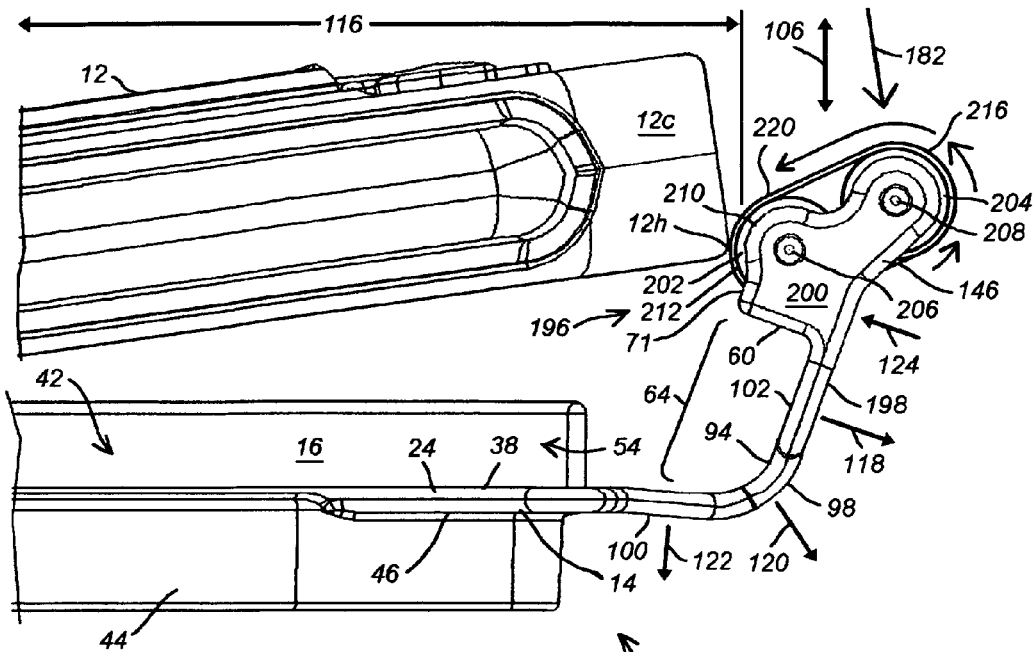
FIG. 30 illustrates the device being inserted into the novel quick release portable device holder, wherein continued insertion pressure forces the more rectangular corner contour of the device into continuous engagement with the conveyer belt during entry.

FIG. 30 illustrates the device 12 being inserted into the holder 10, wherein continued insertion pressure along the direction indicated by arrow 182 forces the more rectangular corner contour 12h of device 12 into continuous engagement with the conveyer belt 216 during entry. Movement of the conveyer belt 216 rotates both the proximate and distal rollers 202, 204 about respective proximate and distal axes 206, 208 such that the belt surface 220 remains in contact with the corner contours 12h of device 12. Therefore, according to well-known physical laws, conveyer belt 216 remains substantially stationary relative to the device 12 as it is being pushed into (or pulled out of) the holder 10, as indicated by arrow 182.

Under continued insertion pressure along direction 182, the corner contour 12h of device 12 moves the conveyer belt 216 over the rollers 202, 204 toward the interior volume 42 of the device holder 10 as the device 12 moves into the receiver pocket 26 and toward the spine 24 of the backing plane 14. Meanwhile, the conveyer belt 216 maintains substantially stationary engagement relative to the corner contours 12h of device 12, and thus cannot scuff, scar or otherwise damage the soft and impressionable materials used in forming all or at least part of the external case of the device 12.

As generally indicated by arrow 118, insertion pressure 182 on the device 12 forces head portion 200 of the spring arm 198 outward of the interior volume 42 by pressuring the belt-and-roller conveyer mechanism 196. Below the substantially rigid suspension cage 146 housing the rollers 202, 204 that support the conveyer belt 216, the stem portion 96 of the spring arm 198 responsively flexes outward of the spine 24 of the backing plane 14 to expanded roller-to-receiver pocket spacing 116 sufficiently wide for the shoulder portions 12d of the device 12 to pass the proximate roller 202 on conveyer belt 216, as generally indicated by arrow 106. Optionally, as generally indicated by arrow 120, the curved root portions 98 of the spring arm 198 is also structured to flex outward of the spine 24 of the backing plane 14 simultaneously with the flexing stem portion 96, whereby the curved root portion 98 is also involved in expanding the relaxed roller-to-receiver pocket spacing 114 to the expanded roller-to-receiver pocket spacing 116 necessary for passing the head portion 12c of the device 12 between the receiver pocket 26 and opposing conveyer belt 216 on proximate and distal rollers 202, 204. Accordingly, involvement of the root portions 98 in spreading the spring arm 198 is also contemplated and may be included as a matter of design choice, as discussed herein, without deviating from the scope and intent of the present invention.

Additionally, as generally indicated by arrow 122, the necked-down base portion 100 of the spring arm 198 is also structured to flex outward of the spine 24 of the backing plane 14 simultaneously with the flexing stem and curved root portions 96 and 98, whereby the necked-down base portion 100 is also involved in expanding the relaxed roller-to-receiver pocket spacing 114 to the expanded roller-to-receiver pocket spacing 116 between the receiver pocket 26 and opposing conveyer belt 216 on proximate and distal rollers 202, 204. Accordingly, involvement of the necked-down base portion 100 in spreading the spring arm 198 is also contemplated and may be included as a matter of design choice, as discussed herein, without deviating from the scope and intent of the present invention.

As illustrated, during the insertion (and removal) process, the more rectangular corner contour 12h of device 12 engages the conveyer belt 216 contacts the contours 12h of the device 12. As indicated by arrow 124, spring pressure of the expanded spring arm 198 causes the conveyer belt 216 to substantially continuously follow contours 12h of device head portion 12c, or device shoulders 12d for a pair of side-mounted conveyer belts 216 mounted on opposing side spring arms 50, 52. The circumference 212 of proximate roller 202 is sufficiently large relative to other components the head portion 200 generally and the device retention tongues 60 particularly such that contact with the device head portion 12c (or shoulders 12d) is effectively restricted to only the conveyer belt 216 during both the insertion and removal processes. The conveyer belt 216 remains in substantially continuous contact with the device head portion 12c (or shoulders 12d) until the back portion 12f of the device 12 is substantially seated against the device resting surface 38 interior of the backing plane 14 with the base portion 12a of the device 12 is seated in the receiver pocket 26, and if present the backwardly protruding portion 12b of the device 12 is received into the cavity 40. Thus, the belt-and-roller conveyer mechanism 196 protects the soft and impressionable elastomer materials of the device head portion 12c (or shoulders 12d) from any contact with the unforgiving rigid material of the rigid suspension cage 146 and head portion 200 generally and the device retention tongues 60 particularly so that scratching and other potential damage to the device 12 is avoided.

Figure 31:
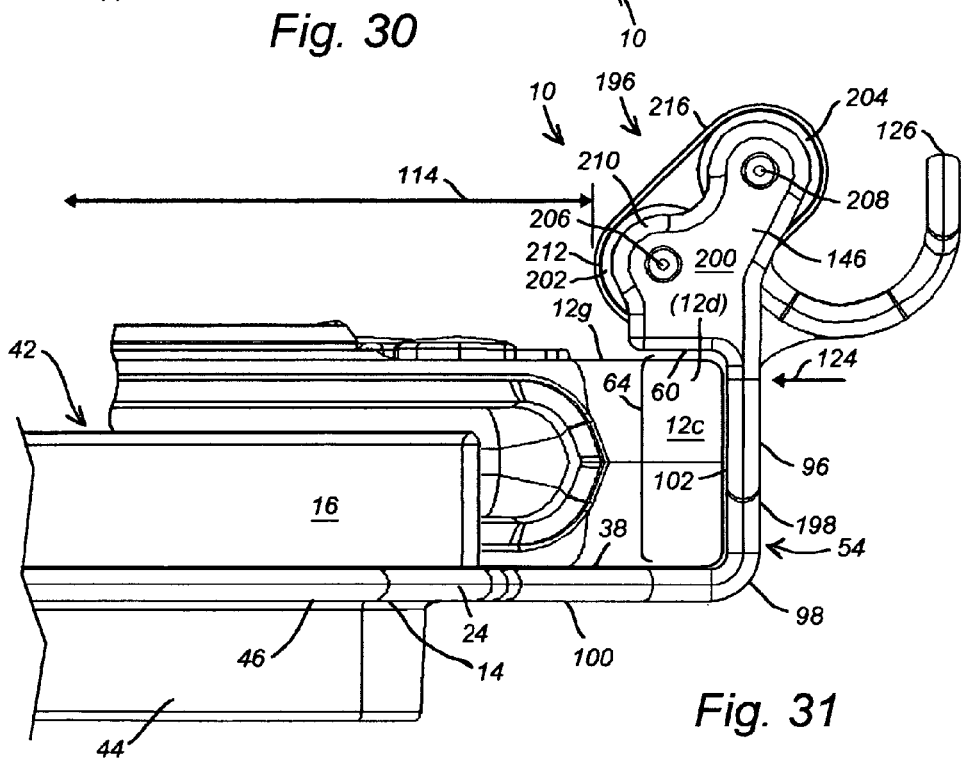
FIG. 31 illustrates the spring arm of the novel quick release portable device holder being contracted from an expanded roller-to-receiver pocket spacing illustrated in FIG. 30 for receiving the device, to the initial relaxed roller-to-receiver pocket spacing.

FIG. 31 illustrates the spring arm 198 contracted from the expanded roller-to-receiver pocket spacing 116 needed to receive the device 12 to the initial relaxed roller-to-receiver pocket spacing 114. The spring arm 198 contracts automatically due to spring pressure, as indicated by arrow 124. The spring arm 198 operates by spring tension caused by bending deflection of the stem portion 96 away the spine 24 of the backing plane 14. Additional spring tension may be caused by the involvement of the root portion 98 in spreading the spring arm 198 as a matter of design choice without deviating from the scope and intent of the present invention. The necked-down base portion 100 may also be incorporated for adding spring tension into the spreading the spring arm 198 as a matter of design choice also without deviating from the scope and intent of the present invention. Accordingly, once the device 12 is past the belt-and-roller conveyer mechanism 196, the head portion 200 snaps back into its relaxed position with its interior surface 62 adjacent to the device head 12c (or shoulders 12d) and the inwardly facing retention tongue 60 adjacent to the face portion 12g of the device head portion 12c (or shoulders 12d). The head portion 200 of the spring arm 198 thus reforms the retention notches 64 between the inwardly facing retention tongue 60 and the device resting surface 38 interior of the backing plane 14. Thereafter, the device head portion 12c (or shoulders 12d) is captured within the retention notch 64, and the device 12 is effectively retained in the interior volume 42 of the device holder 10.

The device 12 is released from the device holder 10 in reverse of the insertion described herein by forcing the device head portion 12c (or shoulders 12d) away from the backing plane 14. Pressure of the head portion 12c against the proximate roller 202 forces the suspension cage 146 and head portion 200 generally to flex outwardly away from the backing plane 14, whereupon the head portion 12c (or shoulders 12d) is rolled through the resulting expanded roller-to-receiver pocket spacing 116.

Incorporation of the belt-and-roller conveyer mechanism 196 with the head portion 200 in the spring arm 198 similarly operates to either retract the device 12 into the holder 10, or to eject it therefrom as a function the position of the axis 206 of the proximate roller 202 relative to the maximum of the contour 12h of the head portion 12c (or shoulders 12d) of the device 12.

Optionally, the head portion 200 is formed with the handle 126 external of the interior volume 42 of the device holder 10. The handle 126 is operable by the user for exerting a force on the spring arm 198 outwardly away from the backing plane 14, as generally indicated by arrow 128 and described herein.

Figure 32:
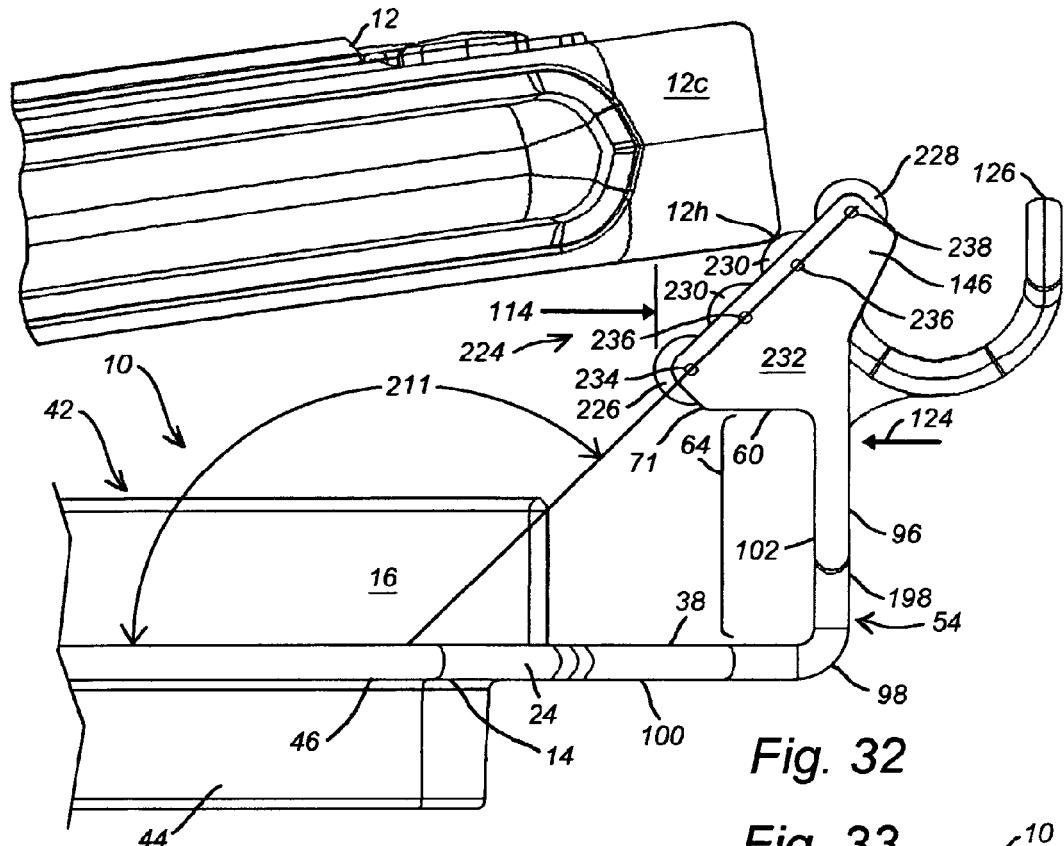
Figure 33:
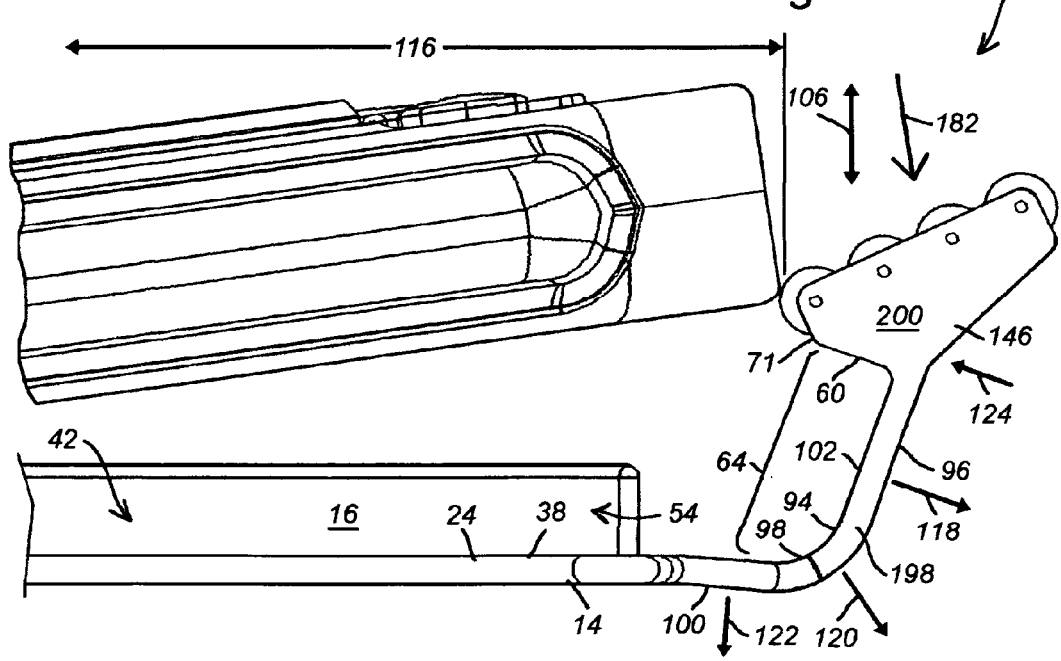

FIGS. 32 and 33 illustrate a variation of the belt-and-roller conveyer mechanism 196 wherein a multi-roller conveyer mechanism 224 is formed of a plurality of very small rollers, including a first roller 226 proximate to the interior volume 42 of the device holder 10, a second roller 228 distal therefrom, and one or more additional rollers 230 between the proximate and distal rollers 226, 228. A head portion 232 adjacent to the terminus of the spring arm 198 includes the suspension cage 146 rotatably suspending the proximate, distal, and intermediate rollers 226, 228 and 230. The proximate, distal, and intermediate rollers 226, 228 and 230 are rotatably suspended by the suspension cage 146 for rotation about respective axes 234, 236, 238. Similarly to the belt-and-roller conveyer mechanism 196 disclosed herein, the respective axes 234, 236, 238 of the proximate, distal, and intermediate rollers 226, 228 and 230 are inclined relative to the interior device resting surface 38 of the backing plane 14 at least in the range of orientation angles 211 that is significantly rotated from parallel toward the backing plane 14, i.e., significantly less than 180 degrees.

Additionally, the head portion 232 includes the retention tongue 60. During insertion and subsequent removal, the proximate rollers 226 space the relatively square contour 12h of the device 12 away from the retention tongue 60 by the set-back 71.

FIG. 32 illustrates the relatively square contour 12h engaging the distal roller 228 or one of the intermediate rollers 230 (shown).

FIG. 33 illustrates the multi-roller conveyer mechanism 224 during insertion of the device 12. Similarly to the belt 216 of the belt-and-roller conveyer mechanism 196, during insertion of the device 12, the relatively square contour 12h engages consecutive ones of the distal, intermediate, and proximate rollers 228, 230 and 226 of the multi-roller conveyer mechanism 224. Accordingly, the rollers 226, 228 and 230 are sufficiently small and closely spaced enough that the multi-roller conveyer mechanism 224 operates similarly to the belt-and-roller conveyer mechanism 196. Therefore, the multi-roller conveyer mechanism 224 is also contemplated and is substantially equivalent to the belt-and-roller conveyer mechanism 196 that it may be substituted without deviating from the scope and intent of the present invention.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:
1. A portable device holder, comprising:
a backing plane formed with a substantially rigid spine portion and comprising a receiver pocket adjacent to a first end thereof;
a substantially spherical ball roller;
one or more latching arms extending from the backing plane and spaced away from the receiver pocket, each of the one or more latching arms further comprising a stem portion coupled to the backing plane and having a head portion spaced away from the backing plane;
a cage coupled to the head portion of one or more of the latching arms in a position spaced away from an interior surface of the backing plane and rotatably retaining the substantially spherical ball roller operably about a spherical rotational axis oriented substantially transverse to a direction substantially normal to the interior surface of the backing plane, wherein the cage retaining the substantially spherical ball roller further comprises a part-spherical ball socket matching the substantially spherical ball roller; and a retention tongue between the substantially spherical ball roller and the interior surface of the backing plane, the retention tongue being positioned distal from the interior surface of the backing plane and immediately proximate to the cage retaining the substantially spherical ball roller being set back from a circumference of the substantially spherical ball roller.

2. The device holder of claim 1 wherein the stem portion of each of the pair of the latching arms further comprises a resiliently flexible stem portion.

3. The device holder of claim 2 wherein the retention tongue further forms a retention notch with the interior surface of the backing plane.

4. The device holder of claim 1 wherein each of the one or more latching arms further comprises a retention tongue between the substantially spherical ball roller and the interior surface of the backing plane and being set back from a circumference of the substantially spherical ball roller.

5. The device holder of claim 4 wherein the cage retaining the substantially spherical ball roller further comprises the retention tongue in a position between the substantially spherical ball roller and the interior surface of the backing plane and being set back from a circumference of the substantially spherical ball roller.

6. The device holder of claim 2 wherein the cage retaining the substantially spherical ball roller further comprises a fork comprising a pair of spaced-apart support flanges extended from the head portion and a pair of cutouts formed on opposing interior surfaces of the flanges.

7. The device holder of claim 6 wherein each of the one or more latching arms further comprises a retention tongue between the substantially spherical ball roller and the interior surface of the backing plane and being set back from a circumference of the substantially spherical ball roller.

8. The device holder of claim 7 wherein the cage retaining the substantially spherical ball roller further comprises the retention tongue in a position between the ball roller and the interior surface of the backing plane and being set back from a circumference of the ball roller.

9. The device holder of claim 2 wherein the substantially spherical ball roller further comprises a substantially rigid material.

10. A portable device holder, comprising:
a backing plane formed with a substantially rigid spine portion having a pair of side walls extended on opposite sides thereof and comprising a receiver pocket adjacent to a first end thereof; and
at least one latching arm extending from the backing plane in a position spaced apart from the receiver pocket and further comprising:
a springingly resilient flexible stem portion coupled to the backing plane, and a terminal head portion comprising a cage spherically rotatably suspending a substantially spherical ball roller in a position that is spaced away from the backing plane opposite from an interior interface surface thereof, wherein the cage suspending the substantially spherical ball roller further comprises a part-spherical ball socket that substantially matches the substantially spherical ball roller and rotatably suspends the substantially spherical ball roller therein with the substantially spherical ball roller being substantially rotatable about an axis that is substantially transverse of a direction that is substantially normal to the interior surface, and the substantially spherical ball roller further comprising a substantially spherical circumference that is extended past the cage, and a retention tongue between the substantially spherical ball roller and the interior surface of the backing plane, the retention tongue being positioned distal from the interior surface of the backing plane and immediately proximate to the cage retaining the substantially spherical ball roller and being set back from a circumference of the substantially spherical ball roller.

11. The device holder of claim 10, further comprising a plurality of the latching arms, one or more of the plurality of latching arms extending from opposite sides the backing plane, and the terminal head portion of each of the plurality of latching arms extending from opposite sides the backing plane facing generally toward the terminal head portion of an opposing one of the latching arms, and the springingly resilient flexible stem portion of each of the plurality of latching arms extending from opposite sides the backing plane further comprising a torsional spring.

12. The device holder of claim 10 wherein the at least one latching arm further comprises at least one latching arm extending from the backing plane adjacent to a second end thereof opposite from the receiver pocket adjacent to a first end thereof.

13. The device holder of claim 10 wherein the cage suspending a substantially spherical ball roller further comprises a fork formed on the terminal head portion facing substantially toward the interior interface surface of the backing plane and spaced away therefrom, the fork comprising a pair of spaced-apart support flanges extended from the head portion and a pair of cutouts formed on opposing interior surfaces of the flanges and rotatably suspending the substantially spherical ball roller therefrom.

14. The device holder of claim 10 wherein the substantially spherical ball roller further comprises a substantially rigid material.

15. A method for holding a portable device, the method comprising:
at least partially inserting a base portion of a portable device into a receiver pocket formed adjacent to a base portion of a backing plane;
moving an upper portion of the device opposite from the base portion thereof toward a spine portion of the backing plane adjacent to the receiver pocket;
with at least one substantially spherical ball roller that is spherically rotatably suspended from a resiliently flexible latching arm having the at least one substantially spherical ball roller rotatably suspended in a part-spherical ball socket that substantially matches the substantially spherical ball roller and rotatably suspends the substantially spherical ball roller therein and with the resiliently flexible latching arm extended from the spine portion of the backing plane and rotatably suspending the substantially spherical ball roller in a position spaced away from and opposite of the spine portion with a retention tongue between the substantially spherical ball roller and an interior surface of the backing plane and the retention tongue being positioned distal from the interior surface of the backing plane and immediately proximate to the ball socket retaining the ball roller and being set back from a circumference of the ball roller, and the resiliently flexible latching arm being in a substantially unflexed relaxed state, rollingly engaging the upper portion of the device;
while rollingly engaging the upper portion of the device with the substantially spherical ball roller, resiliently flexing the latching arm into a resiliently flexed state wherein the latching arm is flexed outwardly of the spine portion of the backing plane;

while rollingly engaging the upper portion of the device with the substantially spherical ball roller, seating the device substantially against the spine portion of the backing plane; substantially simultaneously with seating the device substantially against the spine portion of the backing plane, substantially releasing the latching arm from the resiliently flexed state; and substantially simultaneously with substantially releasing the latching arm from the resiliently flexed state, forming at least one retention notch around a portion of the device.

16. The method of claim 15 wherein the forming at least one retention notch around a portion of the device further comprises forming the retention notch between the spine portion of the backing plane and a retention tongue formed on the latching arm between the substantially spherical ball roller and the spine portion of the backing plane; and wherein the seating the device substantially against the spine portion of the backing plane further comprises rolling the device on a circumferential portion of the substantially spherical ball roller and past the retention tongue.

17. The method of claim 15 wherein having at least one substantially spherical ball roller rotatably suspended from a resiliently flexible latching arm further comprises having the substantially spherical ball roller rotatably suspended in a cage comprising a fork formed on a terminal head portion of the latching arm facing substantially toward the backing plane and spaced away from the spine portion thereof, the fork comprising a pair of spaced-apart support flanges extended from the head portion and a pair of cutouts formed on opposing interior surfaces of the flanges and rotatably suspending the substantially spherical ball roller therefrom.

18. The method of claim 15 wherein having at least one roller rotatably suspended from a resiliently flexible latching arm further comprises suspending a substantially spherical roller comprising a substantially rigid material.

* * * * *